(12) United States Patent
Fujii et al.

(10) Patent No.: US 8,304,488 B2
(45) Date of Patent: *Nov. 6, 2012

(54) CONJUGATED DIENE POLYMER, CONJUGATED DIENE POLYMER COMPOSITION, AND METHOD FOR PRODUCING CONJUGATED DIENE POLYMER

(75) Inventors: Toru Fujii, Chiba (JP); Katsunari Inagaki, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 13/053,938

(22) Filed: Mar. 22, 2011

(65) Prior Publication Data

US 2011/0245408 A1 Oct. 6, 2011

(30) Foreign Application Priority Data

Mar. 30, 2010 (JP) ................................. 2010-077180

(51) Int. Cl.
  *C08L 43/04* (2006.01)
  *C08F 230/08* (2006.01)
  *C08F 293/00* (2006.01)
(52) U.S. Cl. ......................... 524/547; 526/279; 525/271
(58) Field of Classification Search .................. None
  See application file for complete search history.

(56) References Cited

U.S. PATENT DOCUMENTS

| | | | | |
|---|---|---|---|---|
| 3,504,007 A * | 3/1970 | William et al. | ................ | 556/413 |
| 3,853,994 A * | 12/1974 | Barcza | ............................. | 514/63 |
| 3,900,679 A * | 8/1975 | Marzocchi | .................... | 428/378 |
| 4,183,844 A * | 1/1980 | Streck et al. | .................. | 523/209 |
| 4,396,751 A * | 8/1983 | Kampf et al. | ................. | 526/279 |
| 4,397,994 A | 8/1983 | Takeuchi et al. | | |
| 4,894,409 A * | 1/1990 | Shimada et al. | ............. | 524/492 |
| 5,128,416 A * | 7/1992 | Imai et al. | ..................... | 525/254 |
| 5,189,109 A * | 2/1993 | Imai et al. | ..................... | 525/296 |
| 5,459,205 A * | 10/1995 | Furukawa et al. | ............ | 525/446 |
| 5,508,333 A * | 4/1996 | Shimizu | ......................... | 524/424 |
| 7,342,070 B2 * | 3/2008 | Tsukimawashi et al. | ..... | 525/105 |
| 2005/0203251 A1* | 9/2005 | Oshima et al. | ................ | 525/192 |
| 2006/0004143 A1* | 1/2006 | Inagaki et al. | ................ | 525/192 |
| 2008/0289740 A1* | 11/2008 | Mori et al. | ..................... | 152/450 |
| 2009/0005497 A1 | 1/2009 | Maeda et al. | | |
| 2009/0163668 A1* | 6/2009 | Yamada et al. | ............ | 525/331.9 |
| 2009/0203826 A1* | 8/2009 | Rachita et al. | ................ | 524/445 |
| 2009/0203843 A1* | 8/2009 | Fukuoka et al. | ............. | 525/105 |
| 2009/0247692 A1* | 10/2009 | Oshima et al. | ................ | 524/547 |
| 2010/0056703 A1 | 3/2010 | Oshima | | |
| 2010/0056713 A1* | 3/2010 | Oshima | ......................... | 524/572 |
| 2010/0317852 A1* | 12/2010 | Tonomura et al. | ............ | 544/229 |
| 2011/0082251 A1* | 4/2011 | Oshima | ......................... | 524/547 |
| 2011/0237737 A1* | 9/2011 | Fujii et al. | ..................... | 524/526 |
| 2011/0245407 A1* | 10/2011 | Ito et al. | ....................... | 524/547 |

FOREIGN PATENT DOCUMENTS

| | | |
|---|---|---|
| JP | 01-29802 B2 | 6/1982 |
| JP | 2003-160603 A | 6/2003 |
| JP | 2004-292560 A | 10/2004 |
| WO | 2009/113499 A1 | 9/2009 |

OTHER PUBLICATIONS

English Translation of a Singapore Search Report issued in application No. 201102054-2 issued Jun. 8, 2012.

* cited by examiner

*Primary Examiner* — Robert S Loewe
(74) *Attorney, Agent, or Firm* — Sughrue Mion, PLLC

(57) ABSTRACT

Conjugated diene polymer is provided that comprises a constitutional unit based on a conjugated diene and a constitutional unit based on a compound represented by Formula (1) below:

$$R^1Si(\text{—}R^2\text{-}A)_m R^3_{3-m} \quad (1)$$

wherein m represents an integer of 1 to 3; $R^1$ represents a hydrocarbyl group having a polymerizable carbon-carbon double bond; $R^2$ represents a hydrocarbylene group, and, when there are plural $R^2$s, $R^2$s each may be the same or different; A represents a substituted amino group, and, when there are plural A's, A's each may be the same or different; $R^3$ represents a hydrocarbyl group, a substituted hydrocarbyl group or a substituted amino group, and, when there are plural $R^3$s, $R^3$s each may be the same or different.

7 Claims, No Drawings

CONJUGATED DIENE POLYMER, CONJUGATED DIENE POLYMER COMPOSITION, AND METHOD FOR PRODUCING CONJUGATED DIENE POLYMER

BACKGROUND OF THE INVENTION

1. Field of the Invention

The present invention relates to a conjugated diene polymer, a conjugated diene polymer composition, and a method for producing a conjugated diene polymer.

2. Description of Related Art

In recent years, with the growing concern over environmental problems, the demand for good fuel economy for automobiles has been becoming stronger, and there is also a demand for excellent fuel economy for rubber compositions used for automobile tires. As polymer compositions for automobile tires, a rubber composition containing a conjugated diene polymer such as polybutadiene or butadiene-styrene copolymer and a reinforcing agent is used.

For example, JP-A-1-29802 (JP-A denotes a Japanese unexamined patent application publication) proposes a styrene-butadiene copolymer of a high vinyl bond, and a polymer composition using the copolymer.

SUMMARY OF THE INVENTION

However, the polymer composition using a conventional conjugated diene polymer is not sufficiently satisfactory in terms of abrasion resistance.

Under such circumstances, an object of the present invention is to provide a conjugated diene polymer capable of giving a conjugated diene polymer composition excellent in abrasion resistance, and a conjugated diene polymer composition containing the conjugated diene polymer and a reinforcing agent.

A first embodiment of the present invention is directed to a conjugated diene polymer having a constitutional unit based on a conjugated diene, and a constitutional unit based on a compound represented by Formula (1) below.

$$R^1Si(\!-\!R^2\!-\!A)_m R^3{}_{3-m} \quad (1)$$

wherein m represents an integer of 1 to 3; $R^1$ represents a hydrocarbyl group having a polymerizable carbon-carbon double bond; $R^2$ represents a hydrocarbylene group, and, when there are plural $R^2$s, $R^2$s each may be the same or different; A represents a substituted amino group, and, when there are plural A's, A's each may be the same or different; $R^3$ represents a hydrocarbyl group, a substituted hydrocarbyl group or a substituted amino group, and, when there are plural $R^3$s, $R^3$s each may be the same or different.

A second embodiment of the present invention is directed to a conjugated diene polymer composition containing the above-described conjugated diene polymer and a reinforcing agent.

A third embodiment of the present invention is directed to a method for producing a conjugated diene polymer by polymerizing monomers containing the conjugated diene and a compound represented by Formula (1) below by an alkali metal catalyst in a hydrocarbon solvent.

$$R^1Si(\!-\!R^2\!-\!A)_m R^3{}_{3-m} \quad (1)$$

wherein m represents an integer of 1 to 3; $R^1$ represents a hydrocarbyl group having a polymerizable carbon-carbon double bond; $R^2$ represents a hydrocarbylene group, and, when there are plural $R^2$s, $R^2$s each may be the same or different; A represents a substituted amino group, and, when there are plural A's, A's each may be the same or different; $R^3$ represents a hydrocarbyl group, a substituted hydrocarbyl group or a substituted amino group, and, when there are plural $R^3$s, $R^3$s each may be the same or different.

DETAILED DESCRIPTION OF THE INVENTION

The conjugated diene polymer of the present invention is a conjugated diene polymer comprising a constitutional unit based on the conjugated diene and a constitutional unit based on the compound represented by Formula (1) below.

$$R^1Si(\!-\!R^2\!-\!A)_m R^3{}_{3-m} \quad (1)$$

wherein m represents an integer of 1 to 3; $R^1$ represents a hydrocarbyl group having a polymerizable carbon-carbon double bond; $R^2$ represents a hydrocarbylene group, and, when there are plural $R^2$s, $R^2$s each may be the same or different; A represents a substituted amino group, and, when there are plural A's, A's each may be the same or different; $R^3$ represents a hydrocarbyl group, a substituted hydrocarbyl group or a substituted amino group, and, when there are plural $R^3$s, $R^3$s each may be the same or different.

The conjugated diene polymer of the present invention has a constitutional unit based on the conjugated diene (conjugated diene unit). Examples of the conjugated dienes include 1,3-butadiene, isoprene, 1,3-pentadiene, 2,3-dimethyl-1,3-butadiene and 1,3-hexadiene. These dienes may be used singly or in a combination of two or more. As the conjugated diene, 1,3-butadiene and isoprene are preferable.

m in Formula (1) represents an integer of 1 to 3, and is preferably 1 or 2.

$R^1$ in Formula (1) represents a hydrocarbyl group having a polymerizable carbon-carbon double bond, $R^2$ represents a hydrocarbylene group, and, when there are plural $R^2$s, $R^2$s each may be the same or different, A represents a substituted amino group, and, when there are plural A's, A's each may be the same or different, $R^3$ represents a hydrocarbyl group, a substituted hydrocarbyl group or a substituted amino group, and, when there are plural $R^3$s, $R^3$s each may be the same or different.

In the present specification, the hydrocarbyl group represents a hydrocarbon residue. The substituted hydrocarbyl group (a hydrocarbyl group having a substituent) represents a group formed by substituting one or more hydrogen atoms in the hydrocarbon residue by a substituent, the hydrocarbylene group represents a divalent hydrocarbon residue, and the substituted amino group represents a group formed by substituting one or more hydrogen atoms in an amino group by a substituent.

Examples of $R^1$ in Formula (1) include the groups represented by Formula (2) below.

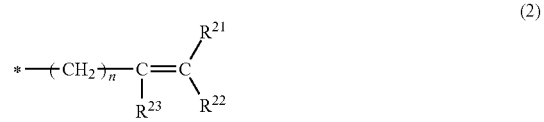

wherein n represents an integer of 0 to 2, $R^{21}$, $R^{22}$ and $R^{23}$ each independently represents a hydrogen atom or a hydrocarbyl group, and * represents a bonding position.

Examples of the hydrocarbyl groups of $R^{21}$, $R^{22}$ and $R^{23}$ include an alkyl group such as a methyl group, an ethyl group, a n-propyl group, an isopropyl group, a n-butyl group, a sec-butyl group, a tert-butyl group, a n-pentyl group, a neopentyl group, an isopentyl group or a n-hexyl group; a cycloalkyl group such as a cyclohexyl group; an aryl group such as a methylphenyl group or an ethylphenyl group; etc.

Examples of the groups represented by Formula (2) include a vinyl group ($R^{21}$, $R^{22}$ and $R^{23}$ each is a hydrogen atom, n=0), an allyl group ($R^{21}$, $R^{22}$ and $R^{23}$ each is a hydrogen atom, n=1), a 1-propenyl group ($R^{21}$ is a methyl group, $R^{22}$ and $R^{23}$ each is a hydrogen atom, n=0), an isopropenyl group ($R^{21}$ and $R^{22}$ each is a hydrogen atom, $R^{23}$ is a methyl group, n=0), a crotyl group ($R^{21}$ is a methyl group, $R^{22}$ and $R^{23}$ each is a hydrogen atom, n=1), a methallyl group ($R^{21}$ and $R^{22}$ each is a hydrogen atom, $R^{23}$ is a methyl group, n=1).

$R^{21}$ and $R^{22}$ each is preferably a hydrogen atom or methyl group, and more preferably a hydrogen atom.

$R^{23}$ is preferably a hydrogen atom or alkyl group, more preferably a hydrogen atom or methyl group.

n in Formula (2) represents an integer of 0 to 2. It is preferably 0 or 1, and more preferably 0.

Formula (2) is preferably a vinyl group ($R^{21}$, $R^{22}$ and $R^{23}$ each is a hydrogen atom, n=0) or an allyl group ($R^{21}$, $R^{22}$ and $R^{23}$ each is a hydrogen atom, n=1), and more preferably a vinyl group ($R^{21}$, $R^{22}$ and $R^{23}$ each is a hydrogen atom, n=0).

Examples of the hydrocarbylene groups of $R^2$ in Formula (1) include alkylene groups such as a methylene group, an ethylene group, a trimethylene group, a tetramethylene group, a pentamethylene group and a hexamethylene group; arylene groups such as a phenylene group, a tolylene group and a xylylene group; and an aralkylene group.

The hydrocarbylene group of $R^2$ has preferably 1 to 10 carbon atoms, and more preferably 1 to 4.

The hydrocarbylene group of $R^2$ is preferably an alkylene group, more preferably an alkylene group having 1 to 4 carbon atoms, and yet more preferably a methylene group or an ethylene group.

Examples of the substituted amino groups in Formula (1) include a group represented by Formula (3) below.

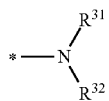

(3)

wherein $R^{31}$ and $R^{32}$ each represents a hydrocarbyl group having 1 to 10 carbon atoms that may have at least one atom selected from the group consisting of a nitrogen atom, an oxygen atom and a silicon atom, a silyl group, a substituted silyl group, or a divalent group having 2 to 20 carbon atoms formed by bonding $R^{31}$ and $R^{32}$, or $R^{31}$ and $R^{32}$ are one group, representing a group having 2 to 20 carbon atoms and being bonded to a nitrogen atom by a double bond and * represents a bonding position.

Examples of the hydrocarbyl groups of $R^{31}$ and $R^{32}$ include an alkyl group such as a methyl group, an ethyl group, a n-propyl group, an isopropyl group, a n-butyl group, a sec-butyl group, a tert-butyl group, a n-pentyl group, a neopentyl group, an isopentyl group or a n-hexyl group; a cycloalkyl group such as a cyclohexyl group; an aryl group such as a phenyl group, a methylphenyl group, or an ethylphenyl group; and an aralkyl group such as a benzyl group. Among term, an alkyl group is preferable.

The number of carbon atoms of the hydrocarbyl group of $R^{31}$ and $R^{32}$ is preferably 6 or less, more preferably 4 or less, and yet preferably 1 or 2.

Examples of the hydrocarbyl groups having a nitrogen atom of $R^{31}$ and $R^{32}$ include a dialkylaminoalkyl group such as a dimethylaminomethyl group, a dimethylaminoethyl group, a dimethylaminopropyl group or a diethylaminoethyl group.

The number of carbon atoms of the hydrocarbyl group having a nitrogen atom of $R^{31}$ and $R^{32}$ is preferably 6 or less, and more preferably 4 or less. The number of carbon atoms is preferably 3 or more.

Examples of the hydrocarbyl groups having an oxygen atom of $R^{31}$ and $R^{32}$ include an alkoxyalkyl group such as a methoxymethyl group, a methoxyethyl group, a methoxypropyl group, an ethoxymethyl group or an ethoxyethyl group; an oxacycloalkyl group such as an oxiranyl group or a tetrahydrofuranyl group; and an oxacycloalkylalkyl group such as a glycidyl group or a tetrahydrofurfuryl group. The oxacycloalkyl group or the oxacycloalkylalkyl group is preferable.

In the present specification, the oxacycloalkyl group represents a group formed by substituting $CH_2$ on an aliphatic ring of a cycloalkyl group by an oxygen atom, and the oxacycloalkylalkyl group represents a group formed by substituting a hydrogen atom of an alkyl group by the oxacycloalkyl group.

The number of carbon atoms of the hydrocarbyl group having an oxygen atom of $R^{31}$ and $R^{32}$ is preferably 6 or less, and more preferably 4 or less. The number of carbon atoms is preferably 2 or more.

Examples of the hydrocarbyl groups having a silicon atom of $R^{31}$ and $R^{32}$ include a trialkylsilylalkyl group such as a trimethylsilylmethyl group.

The number of carbon atoms of the hydrocarbyl group having a silicon atom of $R^{31}$ and $R^{32}$ is preferably 6 or less, and more preferably 4 or less. And the number of carbon atoms is preferably 4 or more.

Examples of the substituted silyl groups of $R^{31}$ and $R^{32}$ include a trialkylsilyl group such as a trimethylsilyl group, a triethylsilyl group or a t-butyldimethylsilyl group; and a trialkoxysilyl group such as a trimethoxysilyl group. Among them, the trialkylsilyl group is preferable.

The number of carbon atoms of the substituted silyl group of $R^{31}$ and $R^{32}$ is preferably 3 to 10, and more preferably 3 to 6.

Examples of the divalent groups having 2 to 20 carbon atoms formed by bonding $R^{31}$ and $R^{32}$ include an alkylene group such as a methylene group, an ethylene group, a trimethylene group, a tetramethylene group, a pentamethylene group, a hexamethylene group, a heptamethylene group, an octamethylene group, a decamethylene group or a dodecamethylene group; an alkenylene group such as a group represented by —CH═CH—CH═CH—; a nitrogen-containing group such as a group represented by —$CH_2CH_2$—NH—$CH_2$—, a group represented by —CH═CH—N═CH—, a group represented by —$CH_2CH_2$—N═CH—, a group represented by —$CH_2CH_2CH_2$—NH—, a group represented by —CH═CHCH═N— or a group represented by —$CH_2CH_2$—NH—$CH_2CH_2$—; and an oxygen-containing group such as a group represented by —$CH_2CH_2$—O—$CH_2CH_2$— or a group represented by —$CH_2CH_2CH_2$—O—$CH_2CH_2CH_2$—.

The number of carbon atoms of the divalent groups having 2 to 20 carbon atoms formed by bonding $R^{31}$ and $R^{32}$ is preferably 2 to 12, and more preferably 2 to 8.

Examples of the groups having 2 to 20 carbon atoms and being bonded to a nitrogen atom of $R^{31}$ and $R^{32}$ by a double bond include a group that may have at least one atom selected from the atom group consisting of a nitrogen atom and an oxygen atom. For example, an ethylidene group, a propylidene group, a butylidene group, a 1-methylethylidene group, a 1-methylpropylidene group, a 1,3-dimethylbutylidene group, a benzylidene group and a 4-N,N-dimethylaminobenzylidene group are cited.

The number of carbon atoms of the group bonded to the nitrogen atom of $R^{31}$ and $R^{32}$ by a double bond is preferably 2 to 12, and more preferably 2 to 8.

Examples of the groups represented by Formula (3) include an acyclic amino group and a cyclic amino group.

Examples of the acyclic amino groups include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group or an ethylmethylamino group; a di(alkoxyalkyl)amino group such as a di(methoxymethyl)amino group, a di(methoxyethyl)amino group, a di(ethoxymethyl)amino group or a di(ethoxyethyl)amino group; and a di(trialkylsilyl)amino group such as a di(trimethylsilyl)amino group or a di(t-butyldimethylsilyl)amino group.

Further, they include a di(oxacycloalkyl)amino group such as a di(oxiranyl)amino group or a di(tetrahydrofuranyl)amino group; and a di(oxacycloalkylalkyl)amino group such as a di(glycidyl)amino group or a di(tetrahydrofurfuryl)amino group.

Furthermore, they include an ethylideneamino group, a 1-methylpropylideneamino group, a 1,3-dimethylbutylideneamino group, a 1-methylethylideneamino group and a 4-N,N-dimethylaminobenzylideneamino group.

Examples of the cyclic amino groups include a 1-polymethyleneimino group such as a 1-aziridinyl group, a 1-azetidinyl group, a 1-pyrrolidinyl group, a 1-piperidinyl group, a 1-hexamethyleneimino group, a 1-heptamethyleneimino group, a 1-octamethyleneimino group, a 1-decamethyleneimino group or a 1-dodecamethyleneimino group. Further, they also include a 1-pyrrolyl group, a 1-imidazolidinyl group, a 1-imidazolyl group, a 4,5-dihydro-1-imidazolyl group, a 1-pyrazolidinyl group, a 1-pyrazolyl group, a 1-piperazinyl group, a morpholino group, etc.

The substituted amino group represented by Formula (3) is preferably a dialkylamino group or a 1-polymethyleneimino group, and more preferably a 1-polymethyleneimino group.

$R^3$ in Formula (1) represents a hydrocarbyl group, a substituted hydrocarbyl group or a substituted amino group.

Examples of the hydrocarbyl groups of $R^3$ include an alkyl group such as a methyl group, an ethyl group, a n-propyl group, an isopropyl group, a n-butyl group, a sec-butyl group, a tert-butyl group, a n-pentyl group, a neopentyl group, an isopentyl group or a n-hexyl group; a cycloalkyl group such as a cyclohexyl group; an aryl group such as a phenyl group, a methylphenyl group or an ethylphenyl group; and an aralkyl group such as a benzyl group. The hydrocarbyl group is preferably an alkyl group.

The number of carbon atoms of the hydrocarbyl group of $R^3$ is preferably 1 to 4, and more preferably 1 or 2.

Examples of the substituted hydrocarbyl groups of $R^3$ include an alkoxyalkyl group such as a methoxymethyl group, a methoxyethyl group, an ethoxymethyl group or an ethoxyethyl group. The substituted hydrocarbyl group is preferably an alkoxyalkyl group, and more preferably an alkoxyalkyl group having 2 to 4 carbon atoms.

The number of carbon atoms of the substituted hydrocarbyl group of $R^3$ is preferably 1 to 4.

Examples of the substituted amino groups of $R^3$ include a dialkylamino group such as a dimethylamino group, a diethylamino group, a di(n-propyl)amino group, a di(isopropyl)amino group, a di(n-butyl)amino group, a di(sec-butyl)amino group, a di(tert-butyl)amino group, a di(neopentyl)amino group or a ethylmethylamino group; an aralkylamino group such as a benzylamino group; an arylamino group such as a phenylamino group; a diarylamino group such as a diphenylamino group; an alkylideneamino group such as an ethylideneamino group, a 1-methylethylideneamino group, a 2-methylpropylideneamino group or a 1,3-dimethylbutylideneamino group; and a cyclic amino group such as a 1-aziridinyl group, a 1-azetidinyl group, a 1-pyrrolidinyl group, a 1-piperidinyl group, a 1-hexamethyleneimino group, a 1-heptamethyleneimino group, a 1-pyrrolyl group, a 1-imidazolidinyl group, a 1-imidazolyl group, a 4,5-dihydro-1-imidazolyl group, a 1-pyrazolidinyl group, a 1-pyrazolyl group, a 1-piperazinyl group or a morpholino group.

The substituted amino group of $R^3$ is preferably an acyclic amino group, and more preferably a dialkylamino group.

$R^3$ is preferably a hydrocarbyl group or a substituted hydrocarbyl group, and more preferably a hydrocarbyl group.

Examples of the compounds represented by Formula (1) include a compound in which $R^1$ is a group represented by Formula (2), m is 1 and A is an acyclic amino group represented by Formula (3). Examples of the compounds include (dialkylamino)alkyldialkylvinylsilane, (dialkylamino)alkyldialkylallylsilane, (dialkylamino)alkyldialkyl-1-propenylsilane, (dialkylamino)alkyldialkylisopropenylsilane, (dialkylamino)alkyldialkylcrotylsilane, and (dialkylamino)alkyldialkylmethallylsilane.

Specific compounds will be exemplified in next and subsequent paragraphs.

(1) (dialkylamino)alkyldialkylvinylsilane:
(dimethylamino)methyldimethylvinylsilane,
(diethylamino)methyldimethylvinylsilane,
(di-n-propylamino)methyldimethylvinylsilane,
(di-n-butylamino)methyldimethylvinylsilane,
(di-t-butylamino)methyldimethylvinylsilane,
(methylethylamino)methyldimethylvinylsilane,
(methyl-n-propylamino)methyldimethylvinylsilane,
(ethyl-n-propylamino)methyldimethylvinylsilane,
(dimethylamino)methylmethylethylvinylsilane,
(dimethylamino)methylmethyl-n-propylvinylsilane,
(dimethylamino)methylethyl-n-propylvinylsilane,
2-(dimethylamino)ethyldimethylvinylsilane,
2-(diethylamino)ethyldimethylvinylsilane,
2-(di-n-propylamino)ethyldimethylvinylsilane,
2-(di-n-butylamino)ethyldimethylvinylsilane,
2-(di-t-butylamino)ethyldimethylvinylsilane,
2-(methylethylamino)ethyldimethylvinylsilane,
2-(methyl-n-propylamino)ethyldimethylvinylsilane,
2-(ethyl-n-propylamino)ethyldimethylvinylsilane,
(dimethylamino)ethylmethylethylvinylsilane,
(dimethylamino)ethylmethyl-n-propylvinylsilane,
dimethylamino)ethylethyl-n-propylvinylsilane,
3-(dimethylamino)-n-propyldimethylvinylsilane,
3-(diethylamino)-n-propyldimethylvinylsilane,
3-(di-n-propylamino)-n-propyldimethylvinylsilane,
3-(di-n-butylamino)-n-propyldimethylvinylsilane,
3-(di-t-butylamino)-n-propyldimethylvinylsilane,
3-(methylethylamino)-n-propyldimethylvinylsilane,
3-(methyl-n-propylamino)-n-propyldimethylvinylsilane,
3-(ethyl-n-propylamino)-n-propyldimethylvinylsilane,
(dimethylamino)-n-propylmethylethylvinylsilane,
(dimethylamino)-n-propylmethyl-n-propylvinylsilane, and
(dimethylamino)-n-propylethyl-n-propylvinylsilane.

(2) (dialkylamino)alkyldialkylallylsilane:
(dimethylamino)methyldimethylallylsilane,
(diethylamino)methyldimethylallylsilane,
(di-n-propylamino)methyldimethylallylsilane,
(di-n-butyl)aminomethyldimethylallylsilane,
(di-t-butyl)aminomethyldimethylallylsilane, (methylethylamino)methyldimethylallylsilane,
(methyl-n-propylamino)methyldimethylallylsilane,
(ethyl-n-propylamino)methyldimethylallylsilane,
(dimethylamino)methylmethylethylallylsilane,
(dimethylamino)methylmethyl-n-propylallylsilane,
(dimethylamino)methylethyl-n-propylallylsilane,
2-(dimethylamino)ethyldimethylallylsilane,
2-(diethylamino)ethyldimethylallylsilane,
2-(di-n-propylamino)ethyldimethylallylsilane,
2-(di-n-butylamino)ethyldimethylallylsilane,
2-(di-t-butylamino)ethyldimethylallylsilane,
2-(methylethylamino)ethyldimethylallylsilane,
2-(methyl-n-propylamino)ethyldimethylallylsilane,
2-(ethyl-n-propylamino)ethyldimethylallylsilane,
(dimethylamino)ethylmethylethylallylsilane,
(dimethylamino)ethylmethyl-n-propylallylsilane,
(dimethylamino)ethylethyl-n-propylallylsilane,
3-(dimethylamino)-n-propyldimethylallylsilane,
3-(diethylamino)-n-propyldimethylallylsilane,
3-(di-n-propylamino)-n-propyldimethylallylsilane,
3-(di-n-butylamino)-n-propyldimethylallylsilane,
3-(di-t-butylamino)-n-propyldimethylallylsilane,
3-(methylethylamino)-n-propyldimethylallylsilane,
3-(methyl-n-propylamino)-n-propyldimethylallylsilane,
3-(ethyl-n-propylamino)-n-propyldimethylallylsilane,
(dimethylamino)-n-propylmethylethylallylsilane,
(dimethylamino)-n-propylmethyl-n-propylallylsilane, and
(dimethylamino)-n-propylethyl-n-propylallylsilane.
(3) (dialkylamino)alkyldialkyl-1-propenylsilane:
(dimethylamino)methyldimethyl-1-propenylsilane,
(diethylamino)methyldimethyl-1-propenylsilane,
(di-n-propylamino)methyldimethyl-1-propenylsilane,
(di-n-butyl)aminomethyldimethyl-1-propenylsilane,
(di-t-butyl)aminomethyldimethyl-1-propenylsilane,
(methylethylamino)methyldimethyl-1-propenylsilane,
(methyl-n-propylamino)methyldimethyl-1-propenylsilane,
(ethyl-n-propylamino)methyldimethyl-1-propenylsilane,
(dimethylamino)methylmethylethyl-1-propenylsilane,
(dimethylamino)methylmethyl-n-propyl-1-propenylsilane,
(dimethylamino)methylethyl-n-propyl-1-propenylsilane,
2-(dimethylamino)ethyldimethyl-1-propenylsilane,
2-(diethylamino)ethyldimethyl-1-propenylsilane,
2-(di-n-propylamino)ethyldimethyl-1-propenylsilane,
2-(di-n-butylamino)ethyldimethyl-1-propenylsilane,
2-(di-t-butylamino)ethyldimethyl-1-propenylsilane,
2-(methylethylamino)ethyldimethyl-1-propenylsilane,
2-(methyl-n-propylamino)ethyldimethyl-1-propenylsilane,
2-(ethyl-n-propylamino)ethyldimethyl-1-propenylsilane,
(dimethylamino)ethylmethylethyl-1-propenylsilane,
(dimethylamino)ethylmethyl-n-propyl-1-propenylsilane,
(dimethylamino)ethylethyl-n-propyl-1-propenylsilane,
3-(dimethylamino)-n-propyldimethyl-1-propenylsilane,
3-(diethylamino)-n-propyldimethyl-1-propenylsilane,
3-(di-n-propylamino)-n-propyldimethyl-1-propenylsilane,
3-(di-n-butylamino)-n-propyldimethyl-1-propenylsilane,
3-(di-t-butylamino)-n-propyldimethyl-1-propenylsilane,
3-(methylethylamino)-n-propyldimethyl-1-propenylsilane,
3-(methyl-n-propylamino)-n-propyldimethyl-1-propenylsilane,
3-(ethyl-n-propylamino)-n-propyldimethyl-1-propenylsilane,
(dimethylamino)-n-propylmethylethyl-1-propenylsilane,
(dimethylamino)-n-propylmethyl-n-propyl-1-propenylsilane, and
(dimethylamino)-n-propylethyl-n-propyl-1-propenylsilane.
(4) (dialkylamino)alkyldialkylisopropenylsilane:
(dimethylamino)methyldimethylisopropenylsilane,
(diethylamino)methyldimethylisopropenylsilane,
(di-n-propylamino)methyldimethylisopropenylsilane,
(di-n-butyl)aminomethyldimethylisopropenylsilane,
(di-t-butyl)aminomethyldimethylisopropenylsilane,
(methylethylamino)methyldimethylisopropenylsilane,
(methyl-n-propylamino)methyldimethylisopropenylsilane,
(ethyl-n-propylamino)methyldimethylisopropenylsilane,
(dimethylamino)methylmethylethylisopropenylsilane,
(dimethylamino)methylmethyl-n-propylisopropenylsilane,
(dimethylamino)methylethyl-n-propylisopropenylsilane,
2-(dimethylamino)ethyldimethylisopropenylsilane,
2-(diethylamino)ethyldimethylisopropenylsilane,
2-(di-n-propylamino)ethyldimethylisopropenylsilane,
2-(di-n-butylamino)ethyldimethylisopropenylsilane,
2-(di-t-butylamino)ethyldimethylisopropenylsilane,
2-(methylethylamino)ethyldimethylisopropenylsilane,
2-(methyl-n-propylamino)ethyldimethylisopropenylsilane,
2-(ethyl-n-propylamino)ethyldimethylisopropenylsilane,
(dimethylamino)ethylmethylethylisopropenylsilane,
(dimethylamino)ethylmethyl-n-propylisopropenylsilane,
(dimethylamino)ethylethyl-n-propylisopropenylsilane,
3-(dimethylamino)-n-propyldimethylisopropenylsilane,
3-(diethylamino)-n-propyldimethylisopropenylsilane,
3-(di-n-propylamino)-n-propyldimethylisopropenylsilane,
3-(di-n-butylamino)-n-propyldimethylisopropenylsilane,
3-(di-t-butylamino)-n-propyldimethylisopropenylsilane,
3-(methylethylamino)-n-propyldimethylisopropenylsilane,
3-(methyl-n-propylamino)-n-propyldimethylisopropenylsilane,
3-(ethyl-n-propylamino)-n-propyldimethylisopropenylsilane,
(dimethylamino)-n-propylmethylethylisopropenylsilane,
(dimethylamino)-n-propylmethyl-n-propylisopropenylsilane, and
(dimethylamino)-n-propylethyl-n-propylisopropenylsilane.
(5) (dialkylamino)alkyldialkylcrotylsilane:
(dimethylamino)methyldimethylcrotylsilane,
(diethylamino)methyldimethylcrotylsilane,
(di-n-propylamino)methyldimethylcrotylsilane,
(di-n-butyl)aminomethyldimethylcrotylsilane,
(di-t-butyl)aminomethyldimethylcrotylsilane,
(methylethylamino)methyldimethylcrotylsilane,
(methyl-n-propylamino)methyldimethylcrotylsilane,
(ethyl-n-propylamino)methyldimethylcrotylsilane,
(dimethylamino)methylmethylethylcrotylsilane,
(dimethylamino)methylmethyl-n-propylcrotylsilane,
(dimethylamino)methylethyl-n-propylcrotylsilane,
2-(dimethylamino)ethyldimethylcrotylsilane,
2-(diethylamino)ethyldimethylcrotylsilane,
2-(di-n-propylamino)ethyldimethylcrotylsilane,
2-(di-n-butylamino)ethyldimethylcrotylsilane,
2-(di-t-butylamino)ethyldimethylcrotylsilane,
2-(methylethylamino)ethyldimethylcrotylsilane,
2-(methyl-n-propylamino)ethyldimethylcrotylsilane,
2-(ethyl-n-propylamino)ethyldimethylcrotylsilane,
(dimethylamino)ethylmethylethylcrotylsilane,
(dimethylamino)ethylmethyl-n-propylcrotylsilane,
(dimethylamino)ethylethyl-n-propylcrotylsilane,
3-(dimethylamino)-n-propyldimethylcrotylsilane,
3-(diethylamino)-n-propyldimethylcrotylsilane,
3-(di-n-propylamino)-n-propyldimethylcrotylsilane,
3-(di-n-butylamino)-n-propyldimethylcrotylsilane,
3-(di-t-butylamino)-n-propyldimethylcrotylsilane,
3-(methylethylamino)-n-propyldimethylcrotylsilane,
3-(methyl-n-propylamino)-n-propyldimethylcrotylsilane,
3-(ethyl-n-propylamino)-n-propyldimethylcrotylsilane,
(dimethylamino)-n-propylmethylethylcrotylsilane, (dimethylamino)-n-propylmethyl-n-propylcrotylsilane, and
(dimethylamino)-n-propylethyl-n-propylcrotylsilane.

(6) (dialkylamino)alkyldialkylmethallylsilane:
(dimethylamino)methyldimethylmethallylsilane,
(diethylamino)methyldimethylmethallylsilane,
(di-n-propylamino)methyldimethylmethallylsilane,
(di-n-butyl)aminomethyldimethylmethallylsilane,
(di-t-butyl)aminomethyldimethylmethallylsilane,
(methylethylamino)methyldimethylmethallylsilane,
(methyl-n-propylamino)methyldimethylmethallylsilane,
(ethyl-n-propylamino)methyldimethylmethallylsilane,
(dimethylamino)methylmethylethylmethallylsilane,
(dimethylamino)methylmethyl-n-propylmethallylsilane,
(dimethylamino)methylethyl-n-propylmethallylsilane,
2-(dimethylamino)ethyldimethylmethallylsilane,
2-(diethylamino)ethyldimethylmethallylsilane,
2-(diethylamino)ethyldimethylmethallylsilane,
2-(di-n-propylamino)ethyldimethylmethallylsilane,
2-(di-n-butylamino)ethyldimethylmethallylsilane,
2-(di-t-butylamino)ethyldimethylmethallylsilane,
2-(methylethylamino)ethyldimethylmethallylsilane,
2-(methyl-n-propylamino)ethyldimethylmethallylsilane,
2-(ethyl-n-propylamino)ethyldimethylmethallylsilane,
(dimethylamino)ethylmethylethylmethallylsilane,
(dimethylamino)ethylmethyl-n-propylmethallylsilane,
(dimethylamino)ethylethyl-n-propylmethallylsilane,
3-(dimethylamino)-n-propyldimethylmethallylsilane,
3-(diethylamino)-n-propyldimethylmethallylsilane
3-(di-n-propylamino)-n-propyldimethylmethallylsilane,
3-(di-n-butylamino)-n-propyldimethylmethallylsilane,
3-(di-t-butylamino)-n-propyldimethylmethallylsilane,
3-(methylethylamino)-n-propyldimethylmethallylsilane,
3-(methyl-n-propylamino)-n-propyldimethylmethallylsilane,
3-(ethyl-n-propylamino)-n-propyldimethylmethallylsilane,
(dimethylamino)-n-propylmethylethylmethallylsilane,
(dimethylamino)-n-propylmethyl-n-propylmethallylsilane, and
(dimethylamino)-n-propylethyl-n-propylmethallylsilane.

As the compound represented by Formula (1), compounds, in which $R^1$ is the group represented by Formula (2), m=1 and A is a cyclic amino group represented by Formula (3), can be cited. Examples of the compounds include:
1-polymethyleneiminoalkyldialkylvinylsilane,
1-polymethyleneiminoalkyldialkylallylsilane,
1-polymethyleneiminoalkyldialkyl-1-propenylsilane,
1-polymethyleneiminoalkyldialkylisopropenylsilane,
1-polymethyleneiminoalkyldialkylcrotylsilane, and
1-polymethyleneiminoalkyldialkylmethallylsilane.
Specific compounds will be exemplified in next and subsequent paragraphs.

(7) 1-polymethyleneiminoalkyldialkylvinylsilane:
1-aziridinylmethyldimethylvinylsilane,
2-(1-aziridinyl)ethyldimethylvinylsilane,
3-(1-aziridinyl)-n-propyldimethylvinylsilane,
1-aziridinylmethyldiethylvinylsilane,
1-aziridinylmethyldi-n-propylvinylsilane,
2-(1-aziridinyl)ethyldiethylvinylsilane,
2-(1-aziridinyl)ethyldi-n-propylvinylsilane,
3-(1-aziridinyl)-n-propyldiethylvinylsilane,
3-(1-aziridinyl)-n-propyldi-n-propylvinylsilane,
1-azeridinylmethyldimethylvinylsilane,
2-(1-azeridinyl)ethyldimethylvinylsilane,
3-(1-azeridinyl)-n-propyldimethylvinylsilane,
1-azeridinylmethyldiethylvinylsilane,
1-azeridinylmethyldi-n-propylvinylsilane,
2-(1-azeridinyl)ethyldiethylvinylsilane,
2-(1-azeridinyl)ethyldi-n-propylvinylsilane,
3-(1-azeridinyl)-n-propyldiethylvinylsilane,
3-(1-azeridinyl)-n-propyldi-n-propylvinylsilane,
dimethyl-1-pyrrolidinylmethylvinylsilane,
dimethyl-2-(1-pyrrolidinyl)ethylvinylsilane,
3-dimethyl-(1-pyrrolidinyl)-n-propylvinylsilane,
diethyl-1-pyrrolidinylmethylvinylsilane,
1-pyrrolidinylmethyldi-n-propylvinylsilane,
diethyl-2-(1-pyrrolidinyl)ethylvinylsilane,
2-(1-pyrrolidinyl)ethyldi-n-propylvinylsilane,
diethyl-3-(1-pyrrolidinyl)-n-propylvinylsilane,
3-(1-pyrrolidinyl)-n-propyldi-n-propylvinylsilane,
dimethyl-1-piperidinylmethylvinylsilane,
dimethyl-2-(1-piperidinyl)ethylvinylsilane,
dimethyl-3-(1-piperidinyl)-n-propylvinylsilane,
diethyl-1-piperidinylmethylvinylsilane,
1-piperidinylmethyldi-n-propylvinylsilane,
2-(1-piperidinyl)ethyldiethylvinylsilane,
2-(1-piperidinyl)ethyldi-n-propylvinylsilane,
diethyl-3-(1-piperidinyl)-n-propylvinylsilane,
3-(1-piperidinyl)-n-propyldi-n-propylvinylsilane,
1-hexamethyleneiminomethyldimethylvinylsilane,
2-(1-hexamethyleneimino)ethyldimethylvinylsilane,
3-(1-hexamethyleneimino)-n-propyldimethylvinylsilane,
diethyl-1-hexamethyleneiminomethylvinylsilane,
1-hexamethyleneiminomethyldi-n-propylvinylsilane,
diethyl-2-(1-hexamethyleneimino)ethylvinylsilane,
2-(1-hexamethyleneimino)ethyldi-n-propylvinylsilane,
diethyl-3-(1-hexamethyleneimino)-n-propylvinylsilane,
3-(1-hexamethyleneimino)-n-propyldi-n-propylvinylsilane,
1-heptamethyleneiminomethyldimethylvinylsilane,
2-(1-heptamethyleneimino)ethyldimethylvinylsilane,
3-(1-heptamethyleneimino)-n-propyldimethylvinylsilane,
diethyl-1-heptamethyleneiminomethylvinylsilane,
1-heptamethyleneiminomethyldi-n-propylvinylsilane,
diethyl-2-(1-heptamethyleneimino)ethylvinylsilane,
2-(1-heptamethyleneimino)ethyldi-n-propylvinylsilane,
diethyl-3-(1-heptamethyleneimino)-n-propylvinylsilane,
3-(1-heptamethyleneimino)-n-propyldi-n-propylvinylsilane,
dimethyl-1-octamethyleneiminomethylvinylsilane,
dimethyl-2-(1-octamethyleneimino)ethylvinylsilane,
dimethyl-3-(1-octamethyleneimino)-n-propylvinylsilane,
diethyl-1-octamethyleneiminomethylvinylsilane,
1-octamethyleneiminomethyldi-n-propylvinylsilane,
diethyl-2-(1-octamethyleneimino)ethylvinylsilane,
2-(1-octamethyleneimino)ethyldi-n-propylvinylsilane,
diethyl-3-(1-octamethyleneimino)-n-propylvinylsilane,
3-(1-octamethyleneimino)-n-propyldi-n-propylvinylsilane,
1-decamethyleneiminomethyldimethylvinylsilane,
2-(1-decamethyleneimino)ethyldimethylvinylsilane,
3-(1-decamethyleneimino)-n-propyldimethylvinylsilane,
1-decamethyleneiminomethyldiethylvinylsilane,
1-decamethyleneiminomethyldi-n-propylvinylsilane,
2-(1-decamethyleneimino)ethyldiethylvinylsilane,
2-(1-decamethyleneimino)ethyldi-n-propylvinylsilane,
3-(1-decamethyleneimino)-n-propyldiethylvinylsilane,
3-(1-decamethyleneimino)-n-propyldi-n-propylvinylsilane,
1-dodecamethyleneiminomethyldimethylvinylsilane,
2-(1-dodecamethyleneimino)ethyldimethylvinylsilane,
3-(1-dodecamethyleneimino)-n-propyldimethylvinylsilane,
1-dodecamethyleneiminomethyldiethylvinylsilane,
1-dodecamethyleneiminomethyldi-n-propylvinylsilane,
2-(1-dodecamethyleneimino)ethyldiethylvinylsilane,
2-(1-dodecamethyleneimino)ethyldi-n-propylvinylsilane,
3-(1-dodecamethyleneimino)-n-propyldiethylvinylsilane, and 3-(1-dodecamethyleneimino)-n-propyldi-n-propylvinylsilane.

(8) 1-polymethyleneiminoalkyldialkylallylsilane:
1-aziridinylmethyldimethylallylsilane,
2-(1-aziridinyl)ethyldimethylallylsilane,
3-(1-aziridinyl)-n-propyldimethylallylsilane,
1-aziridinylmethyldiethylallylsilane,
1-aziridinylmethyldi-n-propylallylsilane,
2-(1-aziridinyl)ethyldiethylallylsilane,
2-(1-aziridinyl)ethyldi-n-propylallylsilane,
3-(1-aziridinyl)-n-propyldiethylallylsilane,
3-(1-aziridinyl)-n-propyldi-n-propylallylsilane,
1-azeridinylmethyldimethylallylsilane,
2-(1-azeridinyl)ethyldimethylallylsilane,
3-(1-azeridinyl)-n-propyldimethylallylsilane,
1-azeridinylmethyldiethylallylsilane,
1-azeridinylmethyldi-n-propylallylsilane,
2-(1-azeridinyl)ethyldiethylallylsilane,
2-(1-azeridinyl)ethyldi-n-propylallylsilane,
3-(1-azeridinyl)-n-propyldiethylallylsilane,
3-(1-azeridinyl)-n-propyldi-n-propylallylsilane,
dimethyl-1-pyrrolidinylmethylallylsilane,
dimethyl-2-(1-pyrrolidinyl)ethylallylsilane,
3-dimethyl-(1-pyrrolidinyl)-n-propylallylsilane,
diethyl-1-pyrrolidinylmethylallylsilane,
1-pyrrolidinylmethyldi-n-propylallylsilane,
diethyl-2-(1-pyrrolidinyl)ethylallylsilane,
2-(1-pyrrolidinyl)ethyldi-n-propylallylsilane,
diethyl-3-(1-pyrrolidinyl)-n-propylallylsilane,
3-(1-pyrrolidinyl)-n-propyldi-n-propylallylsilane,
dimethyl-1-piperidinylmethylallylsilane,
dimethyl-2-(1-piperidinyl)ethylallylsilane,
dimethyl-3-(1-piperidinyl)-n-propylallylsilane,
diethyl-1-piperidinylmethylallylsilane,
1-piperidinylmethyldi-n-propylallylsilane,
2-(1-piperidinyl)ethyldiethylallylsilane,
2-(1-piperidinyl)ethyldi-n-propylallylsilane,
diethyl-3-(1-piperidinyl)-n-propylallylsilane,
3-(1-piperidinyl)-n-propyldi-n-propylallylsilane,
1-hexamethyleneiminomethyldimethylallylsilane,
2-(1-hexamethyleneimino)ethyldimethylallylsilane,
3-(1-hexamethyleneimino)-n-propyldimethylallylsilane,
diethyl-1-hexamethyleneiminomethylallylsilane,
1-hexamethyleneiminomethyldi-n-propylallylsilane,
diethyl-2-(1-hexamethyleneimino)ethylallylsilane,
2-(1-hexamethyleneimino)ethyldi-n-propylallylsilane,
diethyl-3-(1-hexamethyleneimino)-n-propylallylsilane,
3-(1-hexamethyleneimino)-n-propyldi-n-propylallylsilane,
1-heptamethyleneiminomethyldimethylallylsilane,
2-(1-heptamethyleneimino)ethyldimethylallylsilane,
3-(1-heptamethyleneimino)-n-propyldimethylallylsilane,
diethyl-1-heptamethyleneiminomethylallylsilane,
1-heptamethyleneiminomethyldi-n-propylallylsilane,
diethyl-2-(1-heptamethyleneimino)ethylallylsilane,
2-(1-heptamethyleneimino)ethyldi-n-propylallylsilane,
diethyl-3-(1-heptamethyleneimino)-n-propylallylsilane,
3-(1-heptamethyleneimino)-n-propyldi-n-propylallylsilane,
dimethyl-1-octamethyleneiminomethylallylsilane,
dimethyl-2-(1-octamethyleneimino)ethylallylsilane,
dimethyl-3-(1-octamethyleneimino)-n-propylallylsilane,
diethyl-1-octamethyleneiminomethylallylsilane,
1-octamethyleneiminomethyldi-n-propylallylsilane,
diethyl-2-(1-octamethyleneimino)ethylallylsilane,
2-(1-octamethyleneimino)ethyldi-n-propylallylsilane,
diethyl-3-(1-octamethyleneimino)-n-propylallylsilane,
3-(1-octamethyleneimino)-n-propyldi-n-propylallylsilane,
1-decamethyleneiminomethyldimethylallylsilane,
2-(1-decamethyleneimino)ethyldimethylallylsilane,
3-(1-decamethyleneimino)-n-propyldimethylallylsilane,
1-decamethyleneiminomethyldiethylallylsilane,
1-decamethyleneiminomethyldi-n-propylallylsilane,
2-(1-decamethyleneimino)ethyldiethylallylsilane,
2-(1-decamethyleneimino)ethyldi-n-propylallylsilane,
3-(1-decamethyleneimino)-n-propyldiethylallylsilane,
3-(1-decamethyleneimino)-n-propyldi-n-propylallylsilane,
1-dodecamethyleneiminomethyldimethylallylsilane,
2-(1-dodecamethyleneimino)ethyldimethylallylsilane,
3-(1-dodecamethyleneimino)-n-propyldimethylallylsilane,
1-dodecamethyleneiminomethyldiethylallylsilane,
1-dodecamethyleneiminomethyldi-n-propylallylsilane,
2-(1-dodecamethyleneimino)ethyldiethylallylsilane,
2-(1-dodecamethyleneimino)ethyldi-n-propylallylsilane,
3-(1-dodecamethyleneimino)-n-propyldiethylallylsilane, and
3-(1-dodecamethyleneimino)-n-propyldi-n-propylallylsilane.

(9) 1-polymethyleneiminoalkyldialkyl-1-propenylsilane:
1-aziridinylmethyldimethyl-1-propenylsilane,
2-(1-aziridinyl)ethyldimethyl-1-propenylsilane,
3-(1-aziridinyl)-n-propyldimethyl-1-propenylsilane,
1-aziridinylmethyldiethyl-1-propenylsilane,
1-aziridinylmethyldi-n-propyl-1-propenylsilane,
2-(1-aziridinyl)ethyldiethyl-1-propenylsilane,
2-(1-aziridinyl)ethyldi-n-propyl-1-propenylsilane,
3-(1-aziridinyl)-n-propyldiethyl-1-propenylsilane,
3-(1-aziridinyl)-n-propyldi-n-propyl-1-propenylsilane,
1-azeridinylmethyldimethyl-1-propenylsilane,
2-(1-azeridinyl)ethyldimethyl-1-propenylsilane,
3-(1-azeridinyl)-n-propyldimethyl-1-propenylsilane,
1-azeridinylmethyldiethyl-1-propenylsilane,
1-azeridinylmethyldi-n-propyl-1-propenylsilane,
2-(1-azeridinyl)ethyldiethyl-1-propenylsilane,
2-(1-azeridinyl)ethyldi-n-propyl-1-propenylsilane,
3-(1-azeridinyl)-n-propyldiethyl-1-propenylsilane,
3-(1-azeridinyl)-n-propyldi-n-propyl-1-propenylsilane,
dimethyl-1-pyrrolidinylmethyl-1-propenylsilane,
dimethyl-2-(1-pyrrolidinyl)ethyl-1-propenylsilane,
3-dimethyl-(1-pyrrolidinyl)-n-propyl-1-propenylsilane,
diethyl-1-pyrrolidinylmethyl-1-propenylsilane,
1-pyrrolidinylmethyldi-n-propyl-1-propenylsilane,
diethyl-2-(1-pyrrolidinyl)ethyl-1-propenylsilane,
2-(1-pyrrolidinyl)ethyldi-n-propyl-1-propenylsilane,
diethyl-3-(1-pyrrolidinyl)-n-propyl-1-propenylsilane,
3-(1-pyrrolidinyl)-n-propyldi-n-propyl-1-propenylsilane,
dimethyl-1-piperidinylmethyl-1-propenylsilane,
dimethyl-2-(1-piperidinyl)ethyl-1-propenylsilane,
dimethyl-3-(1-piperidinyl)-n-propyl-1-propenylsilane,
diethyl-1-piperidinylmethyl-1-propenylsilane,
1-piperidinylmethyldi-n-propyl-1-propenylsilane,
2-(1-piperidinyl)ethyldiethyl-1-propenylsilane,
2-(1-piperidinyl)ethyldi-n-propyl-1-propenylsilane,
diethyl-3-(1-piperidinyl)-n-propyl-1-propenylsilane,
3-(1-piperidinyl)-n-propyldi-n-propyl-1-propenylsilane,
1-hexamethyleneiminomethyldimethyl-1-propenylsilane,
2-(1-hexamethyleneimino)ethyldimethyl-1-propenylsilane,
3-(1-hexamethyleneimino)-n-propyldimethyl-1-propenylsilane,
diethyl-1-hexamethyleneiminomethyl-1-propenylsilane,
1-hexamethyleneiminomethyldi-n-propyl-1-propenylsilane,
diethyl-2-(1-hexamethyleneimino)ethyl-1-propenylsilane,
2-(1-hexamethyleneimino)ethyldi-n-propyl-1-propenylsilane,
diethyl-3-(1-hexamethyleneimino)-n-propyl-1-propenylsilane, 3-(1-hexamethyleneimino)-n-propyldi-n-propyl-1-propenylsilane,
1-heptamethyleneiminomethyldimethyl-1-propenylsilane,
2-(1-heptamethyleneimino)ethyldimethyl-1-propenylsilane,
3-(1-heptamethyleneimino)-n-propyldimethyl-1-propenylsilane,
diethyl-1-heptamethyleneiminomethyl-1-propenylsilane,
1-heptamethyleneiminomethyldi-n-propyl-1-propenylsilane,
diethyl-2-(1-heptamethyleneimino)ethyl-1-propenylsilane,
2-(1-heptamethyleneimino)ethyldi-n-propyl-1-propenylsilane,
diethyl-3-(1-heptamethyleneimino)-n-propyl-1-propenylsilane,
3-(1-heptamethyleneimino)-n-propyldi-n-propyl-1-propenylsilane,
dimethyl-1-octamethyleneiminomethyl-1-propenylsilane,
dimethyl-2-(1-octamethyleneimino)ethyl-1-propenylsilane,
dimethyl-3-(1-octamethyleneimino)-n-propyl-1-propenylsilane,
diethyl-1-octamethyleneiminomethyl-1-propenylsilane,
1-octamethyleneiminomethyldi-n-propyl-1-propenylsilane,
diethyl-2-(1-octamethyleneimino)ethyl-1-propenylsilane,
2-(1-octamethyleneimino)ethyldi-n-propyl-1-propenylsilane,
diethyl-3-(1-octamethyleneimino)-n-propyl-1-propenylsilane,
3-(1-octamethyleneimino)-n-propyldi-n-propyl-1-propenylsilane,
1-decamethyleneiminomethyldimethyl-1-propenylsilane,
2-(1-decamethyleneimino)ethyldimethyl-1-propenylsilane,
3-(1-decamethyleneimino)-n-propyldimethyl-1-propenylsilane,
1-decamethyleneiminomethyldiethyl-1-propenylsilane,
1-decamethyleneiminomethyldi-n-propyl-1-propenylsilane,
2-(1-decamethyleneimino)ethyldiethyl-1-propenylsilane,
2-(1-decamethyleneimino)ethyldi-n-propyl-1-propenylsilane,
3-(1-decamethyleneimino)-n-propyldiethyl-1-propenylsilane,
3-(1-decamethyleneimino)-n-propyldi-n-propyl-1-propenylsilane,
1-dodecamethyleneiminomethyldimethyl-1-propenylsilane,
2-(1-dodecamethyleneimino)ethyldimethyl-1-propenylsilane,
3-(1-dodecamethyleneimino)-n-propyldimethyl-1-propenylsilane,
1-dodecamethyleneiminomethyldiethyl-1-propenylsilane,
1-dodecamethyleneiminomethyldi-n-propyl-1-propenylsilane,
2-(1-dodecamethyleneimino)ethyldiethyl-1-propenylsilane,
2-(1-dodecamethyleneimino)ethyldi-n-propyl-1-propenylsilane,
3-(1-dodecamethyleneimino)-n-propyldiethyl-1-propenylsilane, and
3-(1-dodecamethyleneimino)-n-propyldi-n-propyl-1-propenylsilane.

(10) 1-polymethyleneiminoalkyldialkylisopropenylsilane:
1-aziridinylmethyldimethylisopropenylsilane,
2-(1-aziridinyl)ethyldimethylisopropenylsilane,
3-(1-aziridinyl)-n-propyldimethylisopropenylsilane,
1-aziridinylmethyldiethylisopropenylsilane,
1-aziridinylmethyldi-n-propylisopropenylsilane,
2-(1-aziridinyl)ethyldiethylisopropenylsilane,
2-(1-aziridinyl)ethyldi-n-propylisopropenylsilane,
3-(1-aziridinyl)-n-propyldiethylisopropenylsilane,
3-(1-aziridinyl)-n-propyldi-n-propylisopropenylsilane,
1-azeridinylmethyldimethylisopropenylsilane,
2-(1-azeridinyl)ethyldimethylisopropenylsilane,
3-(1-azeridinyl)-n-propyldimethylisopropenylsilane,
1-azeridinylmethyldiethylisopropenylsilane,
1-azeridinylmethyldi-n-propylisopropenylsilane,
2-(1-azeridinyl)ethyldiethylisopropenylsilane,
2-(1-azeridinyl)ethyldi-n-propylisopropenylsilane,
3-(1-azeridinyl)-n-propyldiethylisopropenylsilane,
3-(1-azeridinyl)-n-propyldi-n-propylisopropenylsilane,
dimethyl-1-pyrrolidinylmethylisopropenylsilane,
dimethyl-2-(1-pyrrolidinyl)ethylisopropenylsilane,
3-dimethyl-(1-pyrrolidinyl)-n-propylisopropenylsilane,
diethyl-1-pyrrolidinylmethylisopropenylsilane,
1-pyrrolidinylmethyldi-n-propylisopropenylsilane,
diethyl-2-(1-pyrrolidinyl)ethylisopropenylsilane,
2-(1-pyrrolidinyl)ethyldi-n-propylisopropenylsilane,
diethyl-3-(1-pyrrolidinyl)-n-propylisopropenylsilane,
3-(1-pyrrolidinyl)-n-propyldi-n-propylisopropenylsilane,
dimethyl-1-piperidinylmethylisopropenylsilane,
dimethyl-2-(1-piperidinyl)ethylisopropenylsilane,
dimethyl-3-(1-piperidinyl)-n-propylisopropenylsilane,
diethyl-1-piperidinylmethylisopropenylsilane,
1-piperidinylmethyldi-n-propylisopropenylsilane,
2-(1-piperidinyl)ethyldiethylisopropenylsilane,
2-(1-piperidinyl)ethyldi-n-propylisopropenylsilane,
diethyl-3-(1-piperidinyl)-n-propylisopropenylsilane,
3-(1-piperidinyl)-n-propyldi-n-propylisopropenylsilane,
1-hexamethyleneiminomethyldimethylisopropenylsilane,
2-(1-hexamethyleneimino)ethyldimethylisopropenylsilane,
3-(1-hexamethyleneimino)-n-propyldimethylisopropenylsilane,
diethyl-1-hexamethyleneiminomethylisopropenylsilane,
1-hexamethyleneiminomethyldi-n-propylisopropenylsilane,
diethyl-2-(1-hexamethyleneimino)ethylisopropenylsilane,
2-(1-hexamethyleneimino)ethyldi-n-propylisopropenylsilane,
diethyl-3-(1-hexamethyleneimino)-n-propylisopropenylsilane,
3-(1-hexamethyleneimino)-n-propyldi-n-propylisopropenylsilane,
1-heptamethyleneiminomethyldimethylisopropenylsilane,
2-(1-heptamethyleneimino)ethyldimethylisopropenylsilane,
3-(1-heptamethyleneimino)-n-propyldimethylisopropenylsilane,
diethyl-1-heptamethyleneiminomethylisopropenylsilane,
1-heptamethyleneiminomethyldi-n-propylisopropenylsilane,
diethyl-2-(1-heptamethyleneimino)ethylisopropenylsilane,
2-(1-heptamethyleneimino)ethyldi-n-propylisopropenylsilane,
diethyl-3-(1-heptamethyleneimino)-n-propylisopropenylsilane,
3-(1-heptamethyleneimino)-n-propyldi-n-propylisopropenylsilane,
dimethyl-1-octamethyleneiminomethylisopropenylsilane,
dimethyl-2-(1-octamethyleneimino)ethylisopropenylsilane,
dimethyl-3-(1-octamethyleneimino)-n-propylisopropenylsilane,
diethyl-1-octamethyleneiminomethylisopropenylsilane,
1-octamethyleneiminomethyldi-n-propylisopropenylsilane,
diethyl-2-(1-octamethyleneimino)ethylisopropenylsilane,
2-(1-octamethyleneimino)ethyldi-n-propylisopropenylsilane,
diethyl-3-(1-octamethyleneimino)-n-propylisopropenylsilane,
3-(1-octamethyleneimino)-n-propyldi-n-propylisopropenylsilane, 1-decamethyleneiminomethyldimethylisopropenylsilane,
2-(1-decamethyleneimino)ethyldimethylisopropenylsilane,
3-(1-decamethyleneimino)-n-propyldimethylisopropenylsilane,
1-decamethyleneiminomethyldiethylisopropenylsilane,
1-decamethyleneiminomethyldi-n-propylisopropenylsilane,
2-(1-decamethyleneimino)ethyldiethylisopropenylsilane,
2-(1-decamethyleneimino)ethyldi-n-propylisopropenylsilane,
3-(1-decamethyleneimino)-n-propyldiethylisopropenylsilane,
3-(1-decamethyleneimino)-n-propyldi-n-propylisopropenylsilane,
1-dodecamethyleneiminomethyldimethylisopropenylsilane,
2-(1-dodecamethyleneimino)ethyldimethylisopropenylsilane,
3-(1-dodecamethyleneimino)-n-propyldimethylisopropenylsilane,
1-dodecamethyleneiminomethyldiethylisopropenylsilane,
1-dodecamethyleneiminomethyldi-n-propylisopropenylsilane,
2-(1-dodecamethyleneimino)ethyldiethylisopropenylsilane,
2-(1-dodecamethyleneimino)ethyldi-n-propylisopropenylsilane,
3-(1-dodecamethyleneimino)-n-propyldiethylisopropenylsilane, and
3-(1-dodecamethyleneimino)-n-propyldi-n-propylisopropenylsilane.

(11) 1-polymethyleneiminoalkyldialkylcrotylsilane:
1-aziridinylmethyldimethylcrotylsilane,
2-(1-aziridinyl)ethyldimethylcrotylsilane, 3-(1-aziridinyl)-n-propyldimethylcrotylsilane,
1-aziridinylmethyldiethylcrotylsilane,
1-aziridinylmethyldi-n-propylcrotylsilane,
2-(1-aziridinyl)ethyldiethylcrotylsilane,
2-(1-aziridinyl)ethyldi-n-propylcrotylsilane,
3-(1-aziridinyl)-n-propyldiethylcrotylsilane,
3-(1-aziridinyl)-n-propyldi-n-propylcrotylsilane,
1-azeridinylmethyldimethylcrotylsilane,
2-(1-azeridinyl)ethyldimethylcrotylsilane, 3-(1-azeridinyl)-n-propyldimethylcrotylsilane,
1-azeridinylmethyldiethylcrotylsilane,
1-azeridinylmethyldi-n-propylcrotylsilane,
2-(1-azeridinyl)ethyldiethylcrotylsilane,
2-(1-azeridinyl)ethyldi-n-propylcrotylsilane,
3-(1-azeridinyl)-n-propyldiethylcrotylsilane,
3-(1-azeridinyl)-n-propyldi-n-propylcrotylsilane,
dimethyl-1-pyrrolidinylmethylcrotylsilane, dimethyl-2-(1-pyrrolidinyl)ethylcrotylsilane,
3-dimethyl-(1-pyrrolidinyl)-n-propylcrotylsilane,
diethyl-1-pyrrolidinylmethylcrotylsilane,
1-pyrrolidinylmethyldi-n-propylcrotylsilane,
diethyl-2-(1-pyrrolidinyl)ethylcrotylsilane,
2-(1-pyrrolidinyl)ethyldi-n-propylcrotylsilane,
diethyl-3-(1-pyrrolidinyl)-n-propylcrotylsilane,
3-(1-pyrrolidinyl)-n-propyldi-n-propylcrotylsilane,
dimethyl-1-piperidinylmethylcrotylsilane, dimethyl-2-(1-piperidinyl)ethylcrotylsilane,
dimethyl-3-(1-piperidinyl)-n-propylcrotylsilane,
diethyl-1-piperidinylmethylcrotylsilane,
1-piperidinylmethyldi-n-propylcrotylsilane,
2-(1-piperidinyl)ethyldiethylcrotylsilane,
2-(1-piperidinyl)ethyldi-n-propylcrotylsilane,
diethyl-3-(1-piperidinyl)-n-propylcrotylsilane,
3-(1-piperidinyl)-n-propyldi-n-propylcrotylsilane,
1-hexamethyleneiminomethyldimethylcrotylsilane,
2-(1-hexamethyleneimino)ethyldimethylcrotylsilane,
3-(1-hexamethyleneimino)-n-propyldimethylcrotylsilane,
diethyl-1-hexamethyleneiminomethylcrotylsilane,
1-hexamethyleneiminomethyldi-n-propylcrotylsilane,
diethyl-2-(1-hexamethyleneimino)ethylcrotylsilane,
2-(1-hexamethyleneimino)ethyldi-n-propylcrotylsilane,
diethyl-3-(1-hexamethyleneimino)-n-propylcrotylsilane,
3-(1-hexamethyleneimino)-n-propyldi-n-propylcrotylsilane,
1-heptamethyleneiminomethyldimethylcrotylsilane,
2-(1-heptamethyleneimino)ethyldimethylcrotylsilane,
3-(1-heptamethyleneimino)-n-propyldimethylcrotylsilane,
diethyl-1-heptamethyleneiminomethylcrotylsilane,
1-heptamethyleneiminomethyldi-n-propylcrotylsilane,
diethyl-2-(1-heptamethyleneimino)ethylcrotylsilane,
2-(1-heptamethyleneimino)ethyldi-n-propylcrotylsilane,
diethyl-3-(1-heptamethyleneimino)-n-propylcrotylsilane,
3-(1-heptamethyleneimino)-n-propyldi-n-propylcrotylsilane,
dimethyl-1-octamethyleneiminomethylcrotylsilane,
dimethyl-2-(1-octamethyleneimino)ethylcrotylsilane,
dimethyl-3-(1-octamethyleneimino)-n-propylcrotylsilane,
diethyl-1-octamethyleneiminomethylcrotylsilane,
1-octamethyleneiminomethyldi-n-propylcrotylsilane,
diethyl-2-(1-octamethyleneimino)ethylcrotylsilane,
2-(1-octamethyleneimino)ethyldi-n-propylcrotylsilane,
diethyl-3-(1-octamethyleneimino)-n-propylcrotylsilane,
3-(1-octamethyleneimino)-n-propyldi-n-propylcrotylsilane,
1-decamethyleneiminomethyldimethylcrotylsilane,
2-(1-decamethyleneimino)ethyldimethylcrotylsilane,
3-(1-decamethyleneimino)-n-propyldimethylcrotylsilane,
1-decamethyleneiminomethyldiethylcrotylsilane,
1-decamethyleneiminomethyldi-n-propylcrotylsilane,
2-(1-decamethyleneimino)ethyldiethylcrotylsilane,
2-(1-decamethyleneimino)ethyldi-n-propylcrotylsilane,
3-(1-decamethyleneimino)-n-propyldiethylcrotylsilane,
3-(1-decamethyleneimino)-n-propyldi-n-propylcrotylsilane,
1-dodecamethyleneiminomethyldimethylcrotylsilane,
2-(1-dodecamethyleneimino)ethyldimethylcrotylsilane,
3-(1-dodecamethyleneimino)-n-propyldimethylcrotylsilane,
1-dodecamethyleneiminomethyldiethylcrotylsilane,
1-dodecamethyleneiminomethyldi-n-propylcrotylsilane,
2-(1-dodecamethyleneimino)ethyldiethylcrotylsilane,
2-(1-dodecamethyleneimino)ethyldi-n-propylcrotylsilane,
3-(1-dodecamethyleneimino)-n-propyldiethylcrotylsilane, and
3-(1-dodecamethyleneimino)-n-propyldi-n-propylcrotylsilane.

(12) 1-polymethyleneiminoalkyldialkylmethallylsilane:
1-aziridinylmethyldimethylmethallylsilane,
2-(1-aziridinyl)ethyldimethylmethallylsilane,
3-(1-aziridinyl)-n-propyldimethylmethallylsilane,
1-aziridinylmethyldiethylmethallylsilane,
1-aziridinylmethyldi-n-propylmethallylsilane,
2-(1-aziridinyl)ethyldiethylmethallylsilane,
2-(1-aziridinyl)ethyldi-n-propylmethallylsilane,
3-(1-aziridinyl)-n-propyldiethylmethallylsilane,
3-(1-aziridinyl)-n-propyldi-n-propylmethallylsilane,
1-azeridinylmethyldimethylmethallylsilane,
2-(1-azeridinyl)ethyldimethylmethallylsilane,
3-(1-azeridinyl)-n-propyldimethylmethallylsilane,
1-azeridinylmethyldiethylmethallylsilane,
1-azeridinylmethyldi-n-propylmethallylsilane,
2-(1-azeridinyl)ethyldiethylmethallylsilane,
2-(1-azeridinyl)ethyldi-n-propylmethallylsilane,
3-(1-azeridinyl)-n-propyldiethylmethallylsilane,
3-(1-azeridinyl)-n-propyldi-n-propylmethallylsilane,
dimethyl-1-pyrrolidinylmethylmethallylsilane,
dimethyl-2-(1-pyrrolidinyl)ethylmethallylsilane, 3-dimethyl-(1-pyrrolidinyl)-n-propylmethallylsilane,
diethyl-1-pyrrolidinylmethylmethallylsilane,
1-pyrrolidinylmethyldi-n-propylmethallylsilane,
diethyl-2-(1-pyrrolidinyl)ethylmethallylsilane,
2-(1-pyrrolidinyl)ethyldi-n-propylmethallylsilane,
diethyl-3-(1-pyrrolidinyl)-n-propylmethallylsilane,
3-(1-pyrrolidinyl)-n-propyldi-n-propylmethallylsilane,
dimethyl-1-piperidinylmethylmethallylsilane,
dimethyl-2-(1-piperidinyl)ethylmethallylsilane,
dimethyl-3-(1-piperidinyl)-n-propylmethallylsilane,
diethyl-1-piperidinylmethylmethallylsilane,
1-piperidinylmethyldi-n-propylmethallylsilane,
2-(1-piperidinyl)ethyldiethylmethallylsilane,
2-(1-piperidinyl)ethyldi-n-propylmethallylsilane,
diethyl-3-(1-piperidinyl)-n-propylmethallylsilane,
3-(1-piperidinyl)-n-propyldi-n-propylmethallylsilane,
1-hexamethyleneiminomethyldimethylmethallylsilane,
2-(1-hexamethyleneimino)ethyldimethylmethallylsilane,
3-(1-hexamethyleneimino)-n-propyldimethylmethallylsilane,
diethyl-1-hexamethyleneiminomethylmethallylsilane,
1-hexamethyleneiminomethyldi-n-propylmethallylsilane,
diethyl-2-(1-hexamethyleneimino)ethylmethallylsilane,
2-(1-hexamethyleneimino)ethyldi-n-propylmethallylsilane,
diethyl-3-(1-hexamethyleneimino)-n-propylmethallylsilane,
3-(1-hexamethyleneimino)-n-propyldi-n-propylmethallylsilane,
1-heptamethyleneiminomethyldimethylmethallylsilane,
2-(1-heptamethyleneimino)ethyldimethylmethallylsilane,
3-(1-heptamethyleneimino)-n-propyldimethylmethallylsilane,
diethyl-1-heptamethyleneiminomethylmethallylsilane,
1-heptamethyleneiminomethyldi-n-propylmethallylsilane,
diethyl-2-(1-heptamethyleneimino)ethylmethallylsilane,
2-(1-heptamethyleneimino)ethyldi-n-propylmethallylsilane,
diethyl-3-(1-heptamethyleneimino)-n-propylmethallylsilane,
3-(1-heptamethyleneimino)-n-propyldi-n-propylmethallylsilane,
dimethyl-1-octamethyleneiminomethylmethallylsilane,
dimethyl-2-(1-octamethyleneimino)ethylmethallylsilane,
dimethyl-3-(1-octamethyleneimino)-n-propylmethallylsilane,
diethyl-1-octamethyleneiminomethylmethallylsilane,
1-octamethyleneiminomethyldi-n-propylmethallylsilane,
diethyl-2-(1-octamethyleneimino)ethylmethallylsilane,
2-(1-octamethyleneimino)ethyldi-n-propylmethallylsilane,
diethyl-3-(1-octamethyleneimino)-n-propylmethallylsilane,
3-(1-octamethyleneimino)-n-propyldi-n-propylmethallylsilane,
1-decamethyleneiminomethyldimethylmethallylsilane,
2-(1-decamethyleneimino)ethyldimethylmethallylsilane,
3-(1-decamethyleneimino)-n-propyldimethylmethallylsilane,
1-decamethyleneiminomethyldiethylmethallylsilane,
1-decamethyleneiminomethyldi-n-propylmethallylsilane,
2-(1-decamethyleneimino)ethyldiethylmethallylsilane,
2-(1-decamethyleneimino)ethyldi-n-propylmethallylsilane,
3-(1-decamethyleneimino)-n-propyldiethylmethallylsilane,
3-(1-decamethyleneimino)-n-propyldi-n-propylmethallylsilane,
1-dodecamethyleneiminomethyldimethylmethallylsilane,
2-(1-dodecamethyleneimino)ethyldimethylmethallylsilane,
3-(1-dodecamethyleneimino)-n-propyldimethylmethallylsilane,
1-dodecamethyleneiminomethyldiethylmethallylsilane,
1-dodecamethyleneiminomethyldi-n-propylmethallylsilane,
2-(1-dodecamethyleneimino)ethyldiethylmethallylsilane,
2-(1-dodecamethyleneimino)ethyldi-n-propylmethallylsilane,
3-(1-dodecamethyleneimino)-n-propyldiethylmethallylsilane, and
3-(1-dodecamethyleneimino)-n-propyldi-n-propylmethallylsilane.

As the compound represented by Formula (1), compounds, in which $R^1$ is a group represented by Formula (2), m=2 and A is an acyclic amino group represented by Formula (3), can be cited. Examples of the compounds include bis(dialkylamino)alkylalkylvinylsilane, bis(dialkylamino)alkyldialkylallylvinylsilane, bis(dialkylamino)alkylalkyl-1-propenylsilane, and bis(dialkylamino)alkylalkylisopropenylsilane. Specific compounds will be exemplified in next and subsequent paragraphs.

(13) bis(dialkylamino)alkylalkylvinylsilane:
bis(dimethylamino)methylmethylvinylsilane,
bis(diethylamino)methylmethylvinylsilane,
bis(di-n-propylamino)methylmethylvinylsilane,
bis(dimethylamino)methylethylvinylsilane,
bis(diethylamino)methylethylvinylsilane,
bis(di-n-propylamino)methylethylvinylsilane,
2-bis(dimethylamino)ethylmethylvinylsilane,
2-bis(diethylamino)ethylmethylvinylsilane,
2-bis(di-n-propylamino)ethylmethylvinylsilane,
2-bis(dimethylamino)ethylethylvinylsilane,
2-bis(diethylamino)ethylethylvinylsilane,
2-bis(di-n-propylamino)ethyl ethylvinylsilane,
3-bis(dimethylamino)-n-propylmethylvinylsilane,
3-bis(diethylamino)-n-propylmethylvinylsilane,
3-bis(di-n-propylamino)-n-propylmethylvinylsilane,
3-bis(dimethylamino)-n-propylethylvinylsilane,
3-bis(diethylamino)-n-propylethylvinylsilane,
3-bis(di-n-propylamino)-n-propylethylvinylsilane.

(14) bis(dialkylamino)alkylalkylallylsilane:
bis(dimethylamino)methylmethylallylsilane,
bis(diethylamino)methylmethylallylsilane,
bis(di-n-propylamino)methylmethylallylsilane,
bis(dimethylamino)methylethylallylsilane,
bis(diethylamino)methylethylallylsilane,
bis(di-n-propylamino)methylethylallylsilane,
2-bis(dimethylamino)ethylmethylallylsilane,
2-bis(diethylamino)ethylmethylallylsilane,
2-bis(di-n-propylamino)ethylmethylallylsilane,
2-bis(dimethylamino)ethylethylallylsilane,
2-bis(diethylamino)ethylethylallylsilane,
2-bis(di-n-propylamino)ethylethylallylsilane,
3-bis(dimethylamino)-n-propylmethylallylsilane,
3-bis(diethylamino)-n-propylmethylallylsilane,
3-bis(di-n-propylamino)-n-propylmethylallylsilane,
3-bis(dimethylamino)-n-propylethylallylsilane,
3-bis(diethylamino)-n-propylethylallylsilane, and
3-bis(di-n-propylamino)-n-propylethylallylsilane.

(15) bis(dialkylamino)alkylalkyl-1-propenylsilane:
bis(dimethylamino)methylmethyl-1-propenylsilane,
bis(diethylamino)methylmethyl-1-propenylsilane,
bis(di-n-propylamino)methylmethyl-1-propenylsilane,
bis(dimethylamino)methylethyl-1-propenylsilane,
bis(diethylamino)methylethyl-1-propenylsilane,
bis(di-n-propylamino)methylethyl-1-propenylsilane,
2-bis(dimethylamino)ethylmethyl-1-propenylsilane,
2-bis(diethylamino)ethylmethyl-1-propenylsilane,
2-bis(di-n-propylamino)ethylmethyl-1-propenylsilane,
2-bis(dimethylamino)ethylethyl-1-propenylsilane,
2-bis(diethylamino)ethylethyl-1-propenylsilane,
2-bis(di-n-propylamino)ethylethyl-1-propenylsilane, 3-bis(dimethylamino)-n-propylmethyl-1-propenylsilane,
3-bis(diethylamino)-n-propylmethyl-1-propenylsilane,
3-bis(di-n-propylamino)-n-propylmethyl-1-propenylsilane,
3-bis(dimethylamino)-n-propylethyl-1-propenylsilane,
3-bis(diethylamino)-n-propylethyl-1-propenylsilane, and
3-bis(di-n-propylamino)-n-propylethyl-1-propenylsilane.
(16) bis(dialkylamino)alkylalkylisopropenylsilane:
bis(dimethylamino)methylmethylisopropenylsilane,
bis(diethylamino)methylmethylisopropenylsilane,
bis(di-n-propylamino)methylmethylisopropenylsilane,
bis(dimethylamino)methylethylisopropenylsilane,
bis(diethylamino)methylethylisopropenylsilane,
bis(di-n-propylamino)methylethylisopropenylsilane,
2-bis(dimethylamino)ethylmethylisopropenylsilane,
2-bis(diethylamino)ethylmethylisopropenylsilane,
2-bis(di-n-propylamino)ethylmethylisopropenylsilane,
2-bis(dimethylamino)ethylethylisopropenylsilane,
2-bis(diethylamino)ethylethylisopropenylsilane,
2-bis(di-n-propylamino)ethylethylisopropenylsilane,
3-bis(dimethylamino)-n-propylmethylisopropenylsilane,
3-bis(diethylamino)-n-propylmethylisopropenylsilane,
3-bis(di-n-propylamino)-n-propylmethylisopropenylsilane,
3-bis(dimethylamino)-n-propylethylisopropenylsilane,
3-bis(diethylamino)-n-propylethylisopropenylsilane, and
3-bis(di-n-propylamino)-n-propylethylisopropenylsilane.

As the compound represented by Formula (1), compounds, in which $R^1$ is the group represented by Formula (2), m=2 and A is a cyclic amino group represented by Formula (3), can be cited. Examples of the compounds include di(1-polymethyleneimino)alkylalkylvinylsilane, di(1-polymethyleneimino)alkylalkylallylsilane, di(1-polymethyleneimino)alkylalkyl-1-propenylsilane, and di(1-polymethyleneimino)alkylalkylisopropenylsilane. Specific compounds will be exemplified in next and subsequent paragraphs.

(17) di(1-polymethyleneimino)alkylalkylvinylsilane:
di(1-pyrrolidinyl)methylmethylvinylsilane,
2,2'-di(1-pyrrolidinyl)ethylmethylvinylsilane,
3,3'-di(1-pyrrolidinyl)-n-propylmethylvinylsilane,
2-di(1-pyrrolidinyl)ethylethylvinylsilane,
2-di(1-pyrrolidinyl)ethyl-n-propylvinylsilane,
3-di(1-pyrrolidinyl)-n-propylethylvinylsilane,
3-di(1-pyrrolidinyl)-n-propyl-n-propylvinylsilane,
di(1-piperidinyl)methylmethylvinylsilane,
2,2'-di(1-piperidinyl)ethylmethylvinylsilane,
3,3'-di(1-piperidinyl)-n-propylmethylvinylsilane,
2-di(1-piperidinyl)ethylethylvinylsilane,
2-di(1-piperidinyl)ethyl-n-propylvinylsilane,
3-di(1-piperidinyl)-n-propylethylvinylsilane,
3-di(1-piperidinyl)-n-propyl-n-propylvinylsilane,
di(1-hexamethyleneimino)methylmethylvinylsilane,
2,2'-di(1-hexamethyleneimino)ethylmethylvinylsilane,
3,3'-di(1-hexamethyleneimino)-n-propylmethylvinylsilane,
2-di(1-hexamethyleneimino)ethylethylvinylsilane,
2-di(1-hexamethyleneimino)ethyl-n-propylvinylsilane,
3-di(1-hexamethyleneimino)-n-propylethylvinylsilane,
3-di(1-hexamethyleneimino)-n-propyl-n-propylvinylsilane,
di(1-heptamethyleneimino)methylmethylvinylsilane,
2,2'-di(1-heptamethyleneimino)ethylmethylvinylsilane,
3,3'-di(1-heptamethyleneimino)-n-propylmethylvinylsilane,
2-di(1-heptamethyleneimino)ethylethylvinylsilane,
2-di(1-heptamethyleneimino)ethyl-n-propylvinylsilane,
3-di(1-heptamethyleneimino)-n-propylethylvinylsilane,
3-di(1-heptamethyleneimino)-n-propyl-n-propylvinylsilane.
(18) di(1-polymethyleneimino)alkylalkylallylsilane:
di(1-pyrrolidinyl)methylmethylallylsilane,
2,2'-di(1-pyrrolidinyl)ethylmethylallylsilane,
3,3'-di(1-pyrrolidinyl)-n-propylmethylallylsilane,
2-di(1-pyrrolidinyl)ethylethylallylsilane,
2-di(1-pyrrolidinyl)ethyl-n-propylallylsilane,
3-di(1-pyrrolidinyl)-n-propylethylallylsilane,
3-di(1-pyrrolidinyl)-n-propyl-n-propylallylsilane,
di(1-piperidinyl)methylmethylallylsilane,
2,2'-di(1-piperidinyl)ethylmethylallylsilane,
3,3'-di(1-piperidinyl)-n-propylmethylallylsilane,
2-di(1-piperidinyl)ethylethylallylsilane,
2-di(1-piperidinyl)ethyl-n-propylallylsilane,
3-di(1-piperidinyl)-n-propylethylallylsilane,
3-di(1-piperidinyl)-n-propyl-n-propylallylsilane,
di(1-hexamethyleneimino)methylmethylallylsilane,
2,2'-di(1-hexamethyleneimino)ethylmethylallylsilane,
3,3'-di(1-hexamethyleneimino)-n-propylmethylallylsilane,
2-di(1-hexamethyleneimino)ethylethylallylsilane,
2-di(1-hexamethyleneimino)ethyl-n-propylallylsilane,
3-di(1-hexamethyleneimino)-n-propylethylallylsilane,
3-di(1-hexamethyleneimino)-n-propyl-n-propylallylsilane,
di(1-heptamethyleneimino)methylmethylallylsilane,
2,2'-di(1-heptamethyleneimino)ethylmethylallylsilane,
3,3'-di(1-heptamethyleneimino)-n-propylmethylallylsilane,
2-di(1-heptamethyleneimino)ethylethylallylsilane,
2-di(1-heptamethyleneimino)ethyl-n-propylallylsilane,
3-di(1-heptamethyleneimino)-n-propylethylallylsilane, and
3-di(1-heptamethyleneimino)-n-propyl-n-propylallylsilane.
(19) di(1-polymethyleneimino)alkylalkyl-1-propenylsilane:
di(1-pyrrolidinyl)methylmethyl-1-propenylsilane,
2,2'-di(1-pyrrolidinyl)ethylmethyl-1-propenylsilane,
3,3'-di(1-pyrrolidinyl)-n-propylmethyl-1-propenylsilane,
2-di(1-pyrrolidinyl)ethylethyl-1-propenylsilane,
2-di(1-pyrrolidinyl)ethyl-n-propyl-1-propenylsilane,
3-di(1-pyrrolidinyl)-n-propylethyl-1-propenylsilane,
3-di(1-pyrrolidinyl)-n-propyl-n-propyl-1-propenylsilane,
di(1-piperidinyl)methylmethyl-1-propenylsilane,
2,2'-di(1-piperidinyl)ethylmethyl-1-propenylsilane,
3,3'-di(1-piperidinyl)-n-propylmethyl-1-propenylsilane,
2-di(1-piperidinyl)ethylethyl-1-propenylsilane,
2-di(1-piperidinyl)ethyl-n-propyl-1-propenylsilane,
3-di(1-piperidinyl)-n-propylethyl-1-propenylsilane,
3-di(1-piperidinyl)-n-propyl-n-propyl-1-propenylsilane,
di(1-hexamethyleneimino)methylmethyl-1-propenylsilane,
2,2'-di(1-hexamethyleneimino)ethylmethyl-1-propenylsilane,
3,3'-di(1-hexamethyleneimino)-n-propylmethyl-1-propenylsilane,
2-di(1-hexamethyleneimino)ethylethyl-1-propenylsilane,
2-di(1-hexamethyleneimino)ethyl-n-propyl-1-propenylsilane,
3-di(1-hexamethyleneimino)-n-propylethyl-1-propenylsilane,
3-di(1-hexamethyleneimino)-n-propyl-n-propyl-1-propenylsilane,
di(1-heptamethyleneimino)methylmethyl-1-propenylsilane,
2,2'-di(1-heptamethyleneimino)ethylmethyl-1-propenylsilane,
3,3'-di(1-heptamethyleneimino)-n-propylmethyl-1-propenylsilane,
2-di(1-heptamethyleneimino)ethylethyl-1-propenylsilane,
2-di(1-heptamethyleneimino)ethyl-n-propyl-1-propenylsilane,
3-di(1-heptamethyleneimino)-n-propylethyl-1-propenylsilane, and
3-di(1-heptamethyleneimino)-n-propyl-n-propyl-1-propenylsilane.
(20) di(1-polymethyleneimino)alkylalkylisopropenylsilane:
di(1-pyrrolidinyl)methylmethylisopropenylsilane,
2,2'-di(1-pyrrolidinyl)ethylmethylisopropenylsilane, 3,3'-di(1-pyrrolidinyl)-n-propylmethylisopropenylsilane,
2-di(1-pyrrolidinyl)ethylethylisopropenylsilane,
2-di(1-pyrrolidinyl)ethyl-n-propylisopropenylsilane,
3-di(1-pyrrolidinyl)-n-propylethylisopropenylsilane,
3-di(1-pyrrolidinyl)-n-propyl-n-propylisopropenylsilane,
di(1-piperidinyl)methylmethylisopropenylsilane,
2,2'-di(1-piperidinyl)ethylmethylisopropenylsilane,
3,3'-di(1-piperidinyl)-n-propylmethylisopropenylsilane,
2-di(1-piperidinyl)ethylethylisopropenylsilane,
2-di(1-piperidinyl)ethyl-n-propylisopropenylsilane,
3-di(1-piperidinyl)-n-propylethylisopropenylsilane,
3-di(1-piperidinyl)-n-propyl-n-propylisopropenylsilane,
di(1-hexamethyleneimino)methylmethylisopropenylsilane,
2,2'-di(1-hexamethyleneimino)ethylmethylisopropenylsilane,
3,3'-di(1-hexamethyleneimino)-n-propylmethylisopropenylsilane,
2-di(1-hexamethyleneimino)ethylethylisopropenylsilane,
2-di(1-hexamethyleneimino)ethyl-n-propylisopropenylsilane,
3-di(1-hexamethyleneimino)-n-propylethylisopropenylsilane,
3-di(1-hexamethyleneimino)-n-propyl-n-propylisopropenylsilane,
di(1-heptamethyleneimino)methylmethylisopropenylsilane,
2,2'-di(1-heptamethyleneimino)ethylmethylisopropenylsilane,
3,3'-di(1-heptamethyleneimino)-n-propylmethylisopropenylsilane,
2-di(1-heptamethyleneimino)ethylethylisopropenylsilane,
2-di(1-heptamethyleneimino)ethyl-n-propylisopropenylsilane,
3-di(1-heptamethyleneimino)-n-propylethylisopropenylsilane,
3-di(1-heptamethyleneimino)-n-propyl-n-propylisopropenylsilane.

As the compound represented by Formula (1), compounds, in which $R^1$ is a group represented by Formula (2), m=3 and A is a substituted amino group represented by Formula (3), can be cited. Examples of the compounds include tri(dialkylamino)alkylvinylsilane, and tri(1-polymethyleneimino)alkylvinylsilane:

(21) tri(dialkylamino)alkylvinylsilane:
tri(dimethylamino)methylvinylsilane,
tri(diethylamino)methylvinylsilane,
2,2',2''-tri(dimethylamino)ethylvinylsilane, and
2,2',2''-tri(diethylamino)ethylvinylsilane.
(22) tri(1-polymethyleneimino)alkylvinylsilane:
tri(1-pyrrolidinyl)methylvinylsilane,
tri(1-pyrrolidinyl)ethylvinylsilane,
2,2',2''-tri(1-pyrrolidinyl)methylvinylsilane, and
2,2',2''-tri(1-pyrrolidinyl)ethylvinylsilane.

As the compound represented by Formula (1), compounds in which m=1, $R^1$ is a group represented by Formula (2), $R^2$ is an alkylene group and $R^3$ is an alkyl group are preferable, compounds in which m=1, $R^1$ is a group represented by Formula (2), $R^2$ is an alkylene group, $R^3$ is an alkyl group and A is a group represented by Formula (3) are more preferable, and (dialkylamino)alkyldialkylvinylsilane and 1-polymethyleneiminoalkyldialkylvinylsilane are yet more preferable. As (dialkylamino)alkyldialkylvinylsilane, dimethyl(dimethylaminomethyl)vinylsilane is preferable, and as 1-polymethyleneiminoalkyldialkylvinylsilane, dimethyl-1-piperidinylmethylvinylsilane is preferable.

As the compound represented by Formula (1), 1-polymethyleneiminoalkyldialkylvinylsilane is particularly preferable.

The content of a monomer unit based on the monomer represented by Formula (1) in the conjugated diene polymer component is preferably not less than 0.001 mmol/g polymer per unit weight of the polymer, more preferably not less than 0.002 mmol/g polymer, and furthermore preferably not less than 0.003 mmol/g polymer, in order to enhance the abrasion resistance. And, it is preferably not more than 0.1 mmol/g polymer, more preferably not more than 0.07 mmol/g polymer, and yet more preferably not more than 0.05 mmol/g polymer.

In order to increase the strength, the conjugated diene polymer has preferably a monomer unit based on an aromatic vinyl monomer. The content of the aromatic vinyl unit is preferably not less than 10% by weight (the conjugated diene unit content is not more than 90% by weight) relative to 100% by weight of the total amount of the conjugated diene unit and the aromatic vinyl unit, and more preferably not less than 15% by weight (the conjugated diene unit content is not more than 85% by weight). Moreover, in order to increase the fuel economy, the content of the aromatic vinyl unit is preferably not more than 50% by weight (the conjugated diene content is not less than 50% by weight), and more preferably not more than 45% by weight (the conjugated diene content is not less than 55% by weight).

The vinyl bond content (proportion of conjugated diene-based 1,2-addition constitutional unity of the conjugated diene polymer is preferably not more than 80% by mol relative to 100% by mol of the conjugated diene content, and more preferably not more than 70% by mol, in order to improve the fuel economy. Moreover, it is preferably not less than 10% by mol, more preferably not less than 15% by mol, furthermore preferably not less than 20% by mol, and particularly preferably not less than 40% by mol, in order to improve grip properties. The vinyl bond content can be determined by IR spectroscopy from the absorption intensity at around 910 cm$^{-1}$, which is an absorption peak of a vinyl group.

The Mooney viscosity ($ML_{1+4}$) of the conjugated diene polymer is preferably not less than 10, and more preferably not less than 20, in order to increase the strength. Moreover, it is preferably not more than 200, and more preferably not more than 150, in order to improve the processability. The Mooney viscosity ($ML_{1+4}$) is measured at 100° C. according to JIS K6300 (1994).

The molecular weight distribution of the conjugated diene polymer is preferably from 1 to 5, and more preferably from 1 to 3, in order to improve the fuel economy. The molecular weight distribution is obtained by measuring the number average molecular weight (Mn) and the weight average molecular weight (Mw) by gel permeation chromatography (GPC) and dividing Mw by Mn.

(Method for Producing Conjugated Diene Polymer)

A favorable method for producing the conjugated diene polymer of the present invention is a method of polymerizing monomers containing conjugated diene and the compound represented by Formula (1) in the presence of an alkali metal catalyst in a hydrocarbon solvent. For example, method A, method B and method C below can be cited.

<Method A>

Method A includes steps a1 and a2 below.
(Step a1): a step of contacting an alkali metal catalyst with a compound represented by Formula (1) in a hydrocarbon solvent to prepare a reaction product of the alkali metal catalyst and the compound, and
(Step a2): a step of polymerizing a monomer containing conjugated diene using the reaction product prepared in step a1 as a polymerization initiator in a hydrocarbon solvent.

<Method B>

Method B includes step b1 below.

(Step b1): a step of copolymerizing monomers containing conjugated diene and the compound represented by Formula (1) in a hydrocarbon solvent in the presence of an alkali metal catalyst.

<Method C>

Method C includes steps c1 and c2 below.

(Step c1): a step of polymerizing a monomer containing conjugated diene in a hydrocarbon solvent in the presence of an alkali metal catalyst to give a polymer having an alkali metal derived from the catalyst at least at one end of a polymer chain having a monomer unit based on the conjugated diene, (Step c2): a step of reacting a compound represented by Formula (1) to the polymer end having an alkali metal, the polymer having been obtained in step c1.

As the monomer in step a2 of method A, a compound represented by Formula (1) may be used, or another monomer to be described later may be used in addition to the conjugated diene. Moreover, step a3 may be included for reacting the polymer end having an alkali metal, the polymer having been obtained in step a2, with the compound represented by Formula (1).

In method B, as the monomer in step b1, another monomer to be described later may be used in addition to the conjugated diene and the compound represented by Formula (1). Moreover, step b2 may be included for reacting the polymer end having an alkali metal, the polymer having been obtained in step b1, with a compound represented by Formula (1).

In method C, as the monomer in step c1, a compound represented by Formula (1) may be used, or another monomer to be described later may be used in addition to the conjugated diene.

As the alkali metal catalyst, alkali metals, organic alkali metal compounds, complexes of an alkali metal and a polar compound, and oligomers having an alkali metal can be cited.

As the alkali metal, lithium, sodium, potassium, rubidium, and cesium can be cited.

Examples of the organic alkali metal compounds include ethyllithium, n-propyllithium, isopropyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithiumhexamethyleneimide, lithiumpyrrolidide, lithiumpiperidide, lithiumheptamethyleneimide, lithiumdodecamethyleneimide, 1,4-dilithio-2-butene, sodium naphthalenide, sodium biphenylide and potassium naphthalenide.

As the complex of an alkali metal and a polar compound, potassium-tetrahydrofuran complex and potassium-di-ethoxyethane complex can be cited.

As the oligomer having an alkali metal, sodium salt of α-methylstyrene tetramer can be mentioned.

The alkali metal catalyst is preferably an organic lithium compound or an organic sodium compound, and more preferably an organic lithium compound or an organic sodium compound having 2 to 20 carbon atoms.

The hydrocarbon solvent used in the production method is a solvent that does not deactivate the organic alkali metal compound catalyst, and aliphatic hydrocarbons, aromatic hydrocarbons, and alicyclic hydrocarbons can be cited. Examples of the aliphatic hydrocarbons include propane, n-butane, isobutane, n-pentane, isopentane, n-hexane, propene, 1-butene, isobutene, trans-2-butene, cis-2-butene, 1-pentene, 2-pentene, 1-hexene, and 2-hexene. Examples of the aromatic hydrocarbons include benzene, toluene, xylene, and ethylbenzene. Examples of alicyclic hydrocarbons include cyclopentane and cyclohexane. These solvents may be used singly or in a combination of two or more, and the hydrocarbon solvent may be a mixture of various components such as industrial hexane. The hydrocarbon solvent is preferably a hydrocarbon having 2 to 12 carbon atoms, more preferably an aliphatic hydrocarbon or a cyclohydrocarbon having 2 to 12 carbon atoms, and most preferably a strait saturated hydrocarbon having 5 to 8 carbons.

As the conjugated diene used in the above production methods, 1,3-butadiene, isoprene, 1,3-pentadiene, 2,3-dimethyl-1,3-butadiene, and 1,3-hexadiene can be cited. These dienes may be used singly or in a combination of two or more. The conjugated diene is preferably 1,3-butadiene or isoprene.

As the other monomer used in steps a2, b1 and c1, an aromatic vinyl, a vinyl nitrile, and an unsaturated carboxylic acid ester can be cited. As the aromatic vinyl, styrene, α-methylstyrene, vinyltoluene, vinylnaphthalene, divinylbenzene, trivinylbenzene, and divinylnaphthalene can be cited. As the vinyl nitrile, acrylonitrile can be mentioned, and, as the unsaturated carboxylic acid ester, methyl acrylate, ethyl acrylate, methyl methacrylate, and ethyl methacrylate can be cited. Among them, an aromatic vinyl is preferable, and styrene is more preferable.

The polymerization step of the production method may be carried out in the presence of an agent for regulating the vinyl bond content of the conjugated diene unit, and/or an agent for regulating the distribution of the conjugated diene unit and the constitutional units based on monomers other than the conjugated diene in the conjugated diene polymer chain (hereinafter, generally cited as "regulators"). As the regulator, ether compounds, tertiary amines, and phosphine compounds can be cited. Examples of the ether compounds include cyclic ethers such as tetrahydrofuran, tetrahydropyran, 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. Examples of the tertiary amines include triethylamine, tripropylamine, tributylamine, N,N,N',N'-tetramethylethylenediamine, N,N-diethylaniline, pyridine, and quinoline. Examples of the phosphine compounds include trimethylphosphine, triethylphosphine, and triphenylphosphine. These regulators may be used singly or in a combination of two or more.

The polymerization temperature in the polymerization step of the production method is preferably 25 to 100° C., and more preferably 35 to 90° C. It is most preferably 50 to 80° C. The polymerization time is preferably 10 minutes to 5 hours.

In the production of the conjugated diene polymer, a coupling agent may be added to the hydrocarbon solution of the conjugated diene polymer as necessary from initiation of polymerization of monomer using an alkali metal catalyst to termination of polymerization. Examples of the coupling agent include a compound represented by Formula (X) below.

$$R^{10}{}_aML_{4-a} \tag{X}$$

wherein $R^{10}$ represents an alkyl group, an alkenyl group, a cycloalkenyl group or an aryl group, M represents a silicon atom or a tin atom, L represents a halogen atom or a hydrocarbyloxy group, and a represents an integer of 0 to 2.

Examples of the coupling agents represented by Formula (X) include silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane and diethoxydiethylsilane.

In order to improve the processability of the conjugated diene polymer, the amount of the coupling agent added is preferably not less than 0.03 mol per mol of the alkali metal originating from the alkali metal catalyst, and more preferably not less than 0.05 mol. Furthermore, in order to improve fuel economy, it is preferably not more than 0.4 mol, and more preferably not more than 0.3 mol.

The conjugated diene polymer may be recovered from the hydrocarbon solution of the conjugated diene polymer by a known recovery method such as, for example, (1) a method in which a coagulant is added to the hydrocarbon solution of the conjugated diene polymer or (2) a method in which steam is added to the hydrocarbon solution of the conjugated diene polymer. The conjugated diene polymer thus recovered may be dried by a known dryer such as a band dryer or an extrusion dryer.

(Conjugated Diene Polymer Composition)

The conjugated diene polymer of the present invention may be used in a conjugated diene polymer composition by combining another polymer component, an additive, etc. therewith.

Examples of said other polymer component include conventional styrene-butadiene copolymer, polybutadiene rubber, butadiene-isoprene copolymer, butyl rubber. Examples further include natural rubber, an ethylene-propylene copolymer, and an ethylene-octane copolymer. One or more types of the polymer components may be used.

In the case where another polymer component is combined with the conjugated diene polymer of the present invention, in order to improve fuel economy, the amount of conjugated diene polymer of the present invention is preferably not less than 10 parts by weight, and more preferably not less than 20 parts by weight per 100 parts by weight of the total amount of polymer components combined (including the amount of conjugated diene polymer combined).

As the additive, a known additive may be used, and examples thereof include a vulcanizing agent such as sulfur or an organic peroxide; a vulcanizing accelerator such as a thiazole-based vulcanizing accelerator, a thiuram-based vulcanizing accelerator, a sulfenamide-based vulcanizing accelerator, a guanidine-based vulcanizing accelerator; a vulcanizing activator such as stearic acid or zinc oxide; a reinforcing agent such as silica or carbon black; a filler such as calcium carbonate, talc, alumina, clay, aluminum hydroxide or mica; a silane coupling agent; an extender oil; a processing aid; an antioxidant; and a lubricant.

Examples of the sulfur include powdered sulfur, precipitated sulfur, colloidal sulfur, insoluble sulfur, and high dispersion sulfur. The amount of sulfur to be mixed is preferably 0.1 to 15 parts by weight relative to 100 parts by weight of the polymer component, more preferably 0.3 to 10 parts by weight, yet more preferably 0.5 to 5 parts by weight.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine and orthotolylbiguanidine. The amount thereof used is preferably 0.1 to 5 parts by weight, and more preferably 0.2 to 3 parts by weight relative to 100 parts by weight of the total amount of polymer components.

Examples of the silica include dry silica (anhydrous silicic acid), wet silica (hydrated silicic acid), colloidal silica, precipitated silica, calcium silicate, and aluminum silicate. These silicas may be used singly or in a combination of two or more. The BET specific surface area of the silica is preferably 50 to 250 $m^2/g$. The BET specific surface area is measured according to ASTM D1993-03. As a commercial product, a trade name ULTRASIL VN3-G manufactured by Degussa, Inc., trade names VN3, AQ, ER, and RS-150 manufactured by Tosoh Silica Corporation, trade names Zeosil 1115 MP and 1165 MP manufactured by Rhodia, etc. may be used.

Examples of the carbon black include channel carbon black such as EPC, MPC, and CC; furnace carbon black such as SAF, ISAF, HAF, MAF, FEF, SRF, GPF, APF, FF, CF, SCF, and ECF; thermal carbon black such as FT and MT; acetylene carbon black; and graphite. These carbons may be used singly or in a combination of two or more.

The nitrogen adsorption specific surface area ($N_2$ SA) of the carbon black is preferably 5 to 200 $m^2/g$, and the dibutyl phthalate (DBP) absorption of the carbon black is preferably 5 to 300 mL/100 g. The nitrogen adsorption specific surface area is measured according to ASTM D4820-93, and the DBP absorption is measured according to ASTM D2414-93. As a commercial product, a trade name DIABLACK N339 manufactured by Mitsubishi Chemical Corporation, trade names SEAST 6, SEAST 7HM, and SEAST KH manufactured by Tokai Carbon Co., Ltd., trade names CK 3 and Special Black 4A manufactured by Degussa, Inc., etc. may be used.

When the conjugated diene polymer is mixed with the reinforcing agent, the amount of the reinforcing agent is preferably 10 to 150 parts by weight relative to 100 parts by weight of the conjugated diene polymer. The content is more preferably not less than 20 parts by weight, and yet more preferably not less than 30 parts by weight, in order to improve abrasion resistance and strength. And, it is more preferably not more than 120 parts by weight, and yet more preferably not more than 100 parts by weight, in order to improve reinforcement.

When the conjugated diene polymer is mixed with the reinforcing agent, in order to improve the fuel economy, the reinforcing agent is preferably silica. The amount of silica added is preferably not less than 50 parts by weight relative to 100 parts by weight of the total content of the reinforcing agent, and more preferably not less than 70 parts by weight.

Examples of the silane coupling agents include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyltetrasulfide, and γ-trimethoxysilylpropylbenzothiazyltetrasulfide. These agents may be used singly or in a combination of two or more. As a commercial product, trade names Si69 and Si75 manufactured by Degussa, Inc., etc. may be used.

When the conjugated diene polymer is mixed with the silane coupling agent, the content of the silane coupling agent is preferably 1 to 20 parts by weight relative to 100 parts by weight of silica, more preferably 2 to 15 parts by weight, yet more preferably 5 to 10 parts by weight.

Examples of the extender oil include an aromatic mineral oil (viscosity-gravity constant (V.G.C. value) 0.900 to 1.049), a naphthenic mineral oil (V.G.C. value 0.850 to 0.899), and a paraffinic mineral oil (V.G.C. value 0.790 to 0.849). The polycyclic aromatic content of the extender oil is preferably less than 3% by weight, and more preferably less than 1% by weight. The polycyclic aromatic content is measured in accordance with British Institute of Petroleum method 346/92. Furthermore, the aromatic compound content (CA) of the extender oil is preferably not less than 20% by weight. One or more types of the extender oil may be used.

As a method for producing a conjugated diene polymer composition by mixing another polymer component, an additive, etc. with the conjugated diene polymer, a known method such as a method, for example, in which the components are kneaded by means of a known mixer such as a roll or Banbury mixer can be used.

With regard to kneading conditions, when an additive other than the vulcanizing agent or the vulcanizing accelerator is mixed, the kneading temperature is usually 50° C. to 200° C. and preferably 80° C. to 190° C., and the kneading time is preferably 30 seconds to 30 minutes and more preferably 1 minute to 30 minutes. When the vulcanizing agent or the vulcanizing accelerator is mixed, the kneading temperature is usually not more than 100° C., and preferably room temperature to 80° C. A composition in which a vulcanizing agent or a vulcanizing accelerator is mixed is usually used after carrying out a vulcanization treatment such as press vulcanization. The vulcanization temperature is preferably 120° C. to 200° C., and more preferably 140° C. to 180° C.

The conjugated diene polymer composition of the present invention has excellent abrasion resistance. The conjugated diene polymer composition has good fuel economy and excellent grip properties.

The conjugated diene polymer and the conjugated diene polymer composition of the present invention are used for tires, shoe soles, flooring materials, vibration-proofing materials, etc., and are used particularly suitably for tires.

The present invention can provide a conjugated diene polymer that can give a conjugated diene polymer composition excellent in abrasion resistance, and a conjugated diene polymer composition containing the conjugated diene polymer and a reinforcing agent. Moreover, the conjugated diene polymer and the conjugated diene polymer composition of the present invention may be excellent in fuel economy.

EXAMPLES

Hereinafter, the present invention will be explained by reference to Examples.

Physical properties were evaluated by the following methods.

1. Mooney Viscosity ($ML_{1+4}$)

The Mooney viscosity of a polymer was measured at 100° C. according to JIS K6300 (1994).

2. Vinyl Bond Content (Unit: % by Mol)

The vinyl bond content of a polymer was determined from the absorption intensity at around 910 $cm^{-1}$ by IR spectroscopy, which is an absorption peak of a vinyl group.

3. Styrene Unit Content (Units: % by Weight)

The styrene unit content of a polymer was determined from refractive index according to JIS K6383 (1995).

4. Molecular Weight Distribution (Mw/Mn)

Weight-average molecular weight (Mw) and number-average molecular weight (Mn) were measured by a gel permeation chromatograph (GPC) method under conditions (1) to (8) below, and the molecular weight distribution (Mw/Mn) of the polymer was determined.

(1) Instrument: HLC-8220 manufactured by Tosoh Corporation
(2) Separation column: HM-H (2 columns in tandem) manufactured by Tosoh Corporation
(3) Measurement temperature: 40° C.
(4) Carrier: tetrahydrofuran
(5) Flow rate: 0.6 mL/min
(6) Amount injected: 5 μL
(7) Detector: differential refractometer
(8) Molecular weight standard: standard polystyrene 5. Abrasion Resistance (Unit: mg/1000 Rotation)

A vulcanized molded body in a ring shape was used as a test piece, and an abrasion amount of 500 rotations to 1,500 rotations, an abrasion amount of 1,500 rotations to 2,500 rotations, and an abrasion amount of 2,500 rotations to 3,500 rotations were measured using Akron Abrasion Tester (Ueshima Seisakusho Co., Ltd.) under the condition of a load of 10 pounds and a test piece rotation number of 300 rpm, and the average thereof was calculated. The smaller this value, the better the abrasion resistance.

6. Fuel Economy

A strip-shaped test piece having a width of 1 or 2 mm and a length of 40 mm was stamped out from a sheet-shaped vulcanized molding and used for testing. The loss tangent (tan δ (70° C.)) at 70° C. of the test piece was measured using a viscoelastometer (Ueshima Seisakusho Co., Ltd.) under conditions of a strain of 1% and a frequency of 10 Hz. The smaller this value, the better the fuel economy.

Example 1

A 20 liter capacity stainless steel polymerization reaction was washed, dried, and flushed with dry nitrogen. Subsequently the vessel was charged with 10.2 kg of industrial hexane (density: 680 Kg/$m^3$), 608 g of 1,3-butadiene, 192 g of styrene, 6.07 ml of tetrahydrofuran and 4.00 ml of ethylene glycol diethyl ether. Subsequently, the vessel was charged with 12.70 mmol of dimethyl-1-piperidinyl methylvinylsilane and 14.59 mmol of n-butyllithium as a n-hexane solution and a polymerization reaction was started.

Copolymerization of 1,3-butadiene, styrene and dimethyl-1-piperidinyl methylvinylsilane was carried out for 3.0 hours at a stirring speed of 130 rpm and the interior temperature of the polymerization reaction vessel of 65° C., while continuously supplying the monomers to the polymerization reactor. The amount of 1,3-butadiene supplied was 912 g, and the amount of styrene supplied was 288 g in the whole polymerization reaction.

Subsequently, to the obtained polymerization reaction solution, 20 ml of a hexane solution containing 0.77 ml of methanol was added, and the polymerization reaction solution was stirred for a further 5 min.

To the polymerization reaction solution were added 7.2 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 3.6 g of pentaerythrityl tetrakis(3-laurylthiopropionate) (trade name: Sumilizer TP-D, manufactured by Sumitomo Chemical Co., Ltd.). Subsequently the polymerization reaction solution was evaporated at room temperature for 24 hours and, further dried under vacuum at 55° C. for 12 hours, thus giving a polymer. The results of evaluation of the polymer are given in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIA-BLACK N339, manufactured by Mitsubishi Chemical Corp.), 47.6 parts by weight of an extender oil (trade name: X-140, manufactured by Kyodo Sekiyu), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using 6-inch rolls, and the sheet was vulcanized by heating at 160° C. for 45 minutes, thus giving a vulcanized sheet. The results of evaluation of the physical properties of the vulcanized sheet are given in Table 1.

Example 2

A 5 liter capacity a stainless steel polymerization reactor was washed, dried, and flushed with dry nitrogen. Subsequently the reactor was charged with 2.55 kg of industrial hexane (density: 680 Kg/m$^3$), 137 g of 1,3-butadiene, 43 g of styrene, 1.52 ml of tetrahydrofuran and 1.12 ml of ethylene glycol diethyl ether. Subsequently, the vessel was charged with 8.70 mmol of dimethyl-1-piperidinylmethylvinylsilane and 3.37 mmol of n-butyllithium as a n-hexane solution and a polymerization reaction was started.

While setting the stirring rate to be 130 rpm and the interior temperature of the polymerization reaction vessel to be 65° C., monomers were continuously fed into the polymerization reaction vessel, and the 1,3-butadiene, styrene and dimethyl-1-piperidinylmethylvinylsilane were copolymerized for 2.5 hours. The amount of 1,3-butadiene fed in the whole polymerization reaction was 205 g, and the amount of styrene fed was 65 g. The polymerization conversion ratio was approximately 100%.

To the polymerization reaction solution was added 10 ml of a hexane solution containing 0.20 ml methanol, and the polymerization reaction solution was stirred for a further 5 minute.

To the polymerization reaction solution thus obtained were added 1.8 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 0.9 g of pentaerythrityltetrakis(3-laurylthiopropionate) (trade name: Sumilizer TP-D, manufactured by Sumitomo Chemical Co., Ltd.). Subsequently the polymerization reaction solution was evaporated at room temperature for 24 hours and, furthermore, dried under vacuum at 55° C. for 12 hours thus giving a polymer. The results of evaluation of the polymer are given in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIA-BLACK N339, manufactured by Mitsubishi Chemical Corp.), 47.6 parts by weight of an extender oil (trade name: X-140, manufactured by Kyodo Sekiyu), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a composition. The composition thus obtained was molded into a sheet using 6-inch rolls, and the sheet was vulcanized by heating at 160° C. for 45 minutes to prepare a vulcanized sheet. The results of evaluation of the physical properties of the vulcanized sheet are given in Table 1.

Comparative Example 1

A 20 L stainless steel polymerization reactor was washed, dried, and flushed with dry nitrogen. Subsequently, the reactor was charged with 10.2 kg of industrial hexane (density: 680 Kg/m$^3$), 547 g of 1,3-butadiene, 173 g of styrene, 6.07 ml of tetrahydrofuran and 4.00 ml of ethylene glycol diethyl ether. Subsequently, the reactor was charged with 14.46 mmol of n-butyllithium as a n-hexane solution and a polymerization reaction was started.

At a stirring speed of 130 rpm and a polymerization reactor internal temperature of 65° C., monomers were continuously fed into the polymerization reactor, and the 1,3-butadiene and styrene were co-polymerized for 3 hours. The amount of 1,3-butadiene supplied was 821 g, and the amount of styrene supplied was 259 g in the whole polymerization reaction.

To the polymerization reaction solution was added 10 ml of a hexane solution containing 0.75 ml of methanol and the polymerization reaction solution was stirred for additional 5 minutes.

To the polymerization reaction solution thus obtained were added 8.0 g of 2-tert-butyl-6-(3-tert-butyl-2-hydroxy-5-methylbenzyl)-4-methylphenyl acrylate (trade name: Sumilizer GM, manufactured by Sumitomo Chemical Co., Ltd.), and 4.0 g of pentaerythrityltetrakis(3-laurylthiopropionate) (trade name: Sumilizer TP-D, manufactured by Sumitomo Chemical Co., Ltd.). Subsequently the polymerization reaction solution was evaporated at room temperature for 24 hours and, furthermore, dried under vacuum at 55° C. for 12 hours thus giving a polymer. The results of evaluation of the polymer are given in Table 1.

100 parts by weight of the polymer thus obtained, 78.4 parts by weight of silica (trade name: Ultrasil VN3-G, manufactured by Degussa, Inc.), 6.4 parts by weight of a silane coupling agent (trade name: Si69, manufactured by Degussa, Inc.), 6.4 parts by weight of carbon black (trade name: DIA-BLACK N339, manufactured by Mitsubishi Chemical Corp.), 47.6 parts by weight of an extender oil (trade name: X-140, manufactured by Kyodo Sekiyu), 1.5 parts by weight of an antioxidant (trade name: Antigene 3C, manufactured by Sumitomo Chemical Co., Ltd.), 2 parts by weight of stearic acid, 2 parts by weight of zinc oxide, 1 part by weight of a vulcanizing accelerator (trade name: Soxinol CZ, manufactured by Sumitomo Chemical Co., Ltd.), 1 part by weight of a vulcanizing accelerator (trade name: Soxinol D, manufactured by Sumitomo Chemical Co., Ltd.), 1.5 parts by weight of a wax (trade name: Sunnoc N, manufactured by Ouchi Shinko Chemical Industrial Co., Ltd.), and 1.4 parts by weight of sulfur were kneaded by means of a Labo Plastomill to prepare a rubber composition. The rubber composition thus obtained was molded into a sheet using 6-inch rolls, and the sheet was vulcanized by heating at 160° C. for 45 minutes to prepare a vulcanized sheet. The results of evaluation of the physical properties of the vulcanized sheet are given in Table 1.

TABLE 1

|  |  | Example 1 | Example 2 | Comp. Exam. 1 |
|---|---|---|---|---|
| Mooney viscosity | — | 36 | 51 | 39 |
| Vinyl bond content | % | 57 | 56 | 57 |
| Content of styrene unit | % by weight | 25 | 24 | 25 |
| Molecular weight distribution | — | 1.08 | 2.81 | 1.06 |
| Abrasion resistance lost amount | mg/1000 rotation | 330 | 310 | 440 |
| Fuel economy tanδ (70° C.) | — | 0.208 | 0.165 | 0.218 |

What is claimed is:

1. Conjugated diene polymer comprising a constitutional unit based on a conjugated diene and a constitutional unit based on a compound represented by Formula (1) below:

wherein m represents an integer of 1 to 3; $R^1$ represents a hydrocarbyl group having a polymerizable carbon-carbon double bond; $R^2$ represents a hydrocarbylene group, and, when there are plural $R^2$s, $R^2$s each may be the same or different; A represents a substituted amino group, and, when there are plural A's, A's each may be the same or different; $R^3$ represents a hydrocarbyl group, a substituted hydrocarbyl group or a substituted amino group, and, when there are plural $R^3$s, $R^3$s each may be the same or different.

2. The conjugated diene polymer according to claim 1, wherein m=1, $R^1$ is a group represented by Formula (2) below, $R^2$ is an alkylene group, and $R^3$ is an alkyl group:

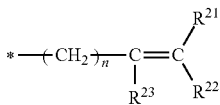

wherein n represents an integer of 0 to 2, $R^{21}$, $R^{22}$ and $R^{23}$ each independently represents a hydrogen atom or a hydrocarbyl group and * represents a bonding position.

3. The conjugated diene polymer according to claim 2, wherein $R^{21}$, $R^{22}$ and $R^{23}$ are hydrogen atoms, and n=0.

4. The conjugated diene polymer according to claim 1, wherein the molecular distribution represented by the ratio of a weight average molecular weight (Mw) and a number average molecular weight (Mn) (Mw/Mn) is 1 to 3.

5. The conjugated diene polymer according to claim 1, wherein the vinyl bond amount of the conjugated diene polymer is from not less than 20% by mole and not more than 70% by mole relative to 100% by mole of the content of the constitutional unit based on the conjugated diene.

6. A conjugated diene polymer composition comprising the conjugated diene polymer described in claim 1 and a reinforcing agent, wherein the content of the reinforcing agent is 10 to 150 parts by weight relative to 100 parts by weight of the conjugated diene polymer.

7. A method for producing a conjugated diene polymer by polymerizing monomers comprising a conjugated diene and a compound represented by Formula (1) below in a hydrocarbon solvent by an alkali metal catalyst:

wherein m represents an integer of 1 to 3; $R^1$ represents a hydrocarbyl group having a polymerizable carbon-carbon double bond; $R^2$ represents a hydrocarbylene group, and, when there are plural $R^2$s, $R^2$s each may be the same or different; A represents a substituted amino group, and, when there are plural A's, A's each may be the same or different; $R^3$ represents a hydrocarbyl group, a substituted hydrocarbyl group or a substituted amino group, and, when there are plural $R^3$s, $R^3$s each may be the same or different.

* * * * *